(12) United States Patent
Rutland

(10) Patent No.: US 11,174,848 B1
(45) Date of Patent: Nov. 16, 2021

(54) CONTROLLING AERIAL VEHICLE COMPONENTS USING SHAPE MEMORY ACTUATORS

(71) Applicant: Amazon Technologies, Inc., Seattle, WA (US)

(72) Inventor: Joseph Rutland, Norfolk (GB)

(73) Assignee: Amazon Technologies, Inc., Seattle, WA (US)

( * ) Notice: Subject to any disclaimer, the term of this patent is extended or adjusted under 35 U.S.C. 154(b) by 765 days.

(21) Appl. No.: 15/883,842

(22) Filed: Jan. 30, 2018

(51) Int. Cl.
| | | |
|---|---|---|
| *F03G 7/06* | (2006.01) | |
| *B64C 27/52* | (2006.01) | |
| *B64C 3/38* | (2006.01) | |
| *B64C 13/28* | (2006.01) | |
| *B64C 25/20* | (2006.01) | |
| *B64C 39/02* | (2006.01) | |
| *B64C 1/14* | (2006.01) | |

(52) U.S. Cl.
CPC ............ *F03G 7/065* (2013.01); *B64C 1/1415* (2013.01); *B64C 3/38* (2013.01); *B64C 13/28* (2013.01); *B64C 25/20* (2013.01); *B64C 27/52* (2013.01); *B64C 39/024* (2013.01); *B64C 2201/021* (2013.01); *B64C 2201/024* (2013.01); *B64C 2201/027* (2013.01)

(58) Field of Classification Search
CPC ......... F03G 7/065; B64C 1/1415; B64C 3/38; B64C 13/28; B64C 25/30; B64C 27/52; B64C 39/024; B64C 2201/021; B64C 2201/024; B64C 2201/027; B64C 2027/7288

See application file for complete search history.

(56) References Cited

U.S. PATENT DOCUMENTS

| | | | |
|---|---|---|---|
| 5,440,193 A | 8/1995 | Barrett | |
| 6,135,713 A | 10/2000 | Domzalski et al. | |
| 6,209,824 B1 | 4/2001 | Caton et al. | |
| 6,322,324 B1 | 11/2001 | Kennedy et al. | |
| 6,465,902 B1 | 10/2002 | Beauchamp et al. | |
| 6,499,952 B1 | 12/2002 | Jacot et al. | |
| 6,669,444 B2 | 12/2003 | Alacqua et al. | |
| 6,672,338 B1* | 1/2004 | Esashi | A61M 25/0138 138/119 |
| 6,834,835 B1* | 12/2004 | Knowles | B64C 3/54 244/198 |
| 7,037,076 B2 | 5/2006 | Jacot et al. | |
| 9,655,679 B2* | 5/2017 | Desai | A61B 90/11 |
| 10,689,093 B1* | 6/2020 | Rutland | B64C 11/02 |
| 2006/0049302 A1 | 3/2006 | Kennedy et al. | |
| 2006/0192046 A1 | 8/2006 | Heath et al. | |

(Continued)

*Primary Examiner* — Rodney A Bonnette

(74) *Attorney, Agent, or Firm* — Athorus, PLLC

(57) ABSTRACT

Shape memory actuators may be used in unmanned aerial vehicles to control various components. For example, shape memory actuators may adjust cant angles of motors, propellers, and other propulsion mechanisms. In addition, shape memory actuators may adjust positions or orientations of various other components of unmanned aerial vehicles, including wings, control surfaces, motor arms, frame sections, payload doors, and landing gears. The shape memory actuators may be formed of various shape memory materials, may be one-way or two-way shape memory actuators, and may change their configurations responsive to heat and/or magnetic fields.

16 Claims, 13 Drawing Sheets

(56) References Cited

U.S. PATENT DOCUMENTS

| | | | |
|---|---|---|---|
| 2014/0060036 A1* | 3/2014 | Gao | F01P 7/10 60/527 |
| 2015/0096293 A1* | 4/2015 | Shome | H01F 41/02 60/528 |
| 2017/0036752 A1 | 2/2017 | Bigbee-Hansen et al. | |
| 2017/0059083 A1* | 3/2017 | Zhang | B64C 39/024 |
| 2017/0197714 A1* | 7/2017 | Golden | B60F 5/02 |
| 2018/0155021 A1* | 6/2018 | Patterson | B64C 37/02 |

* cited by examiner

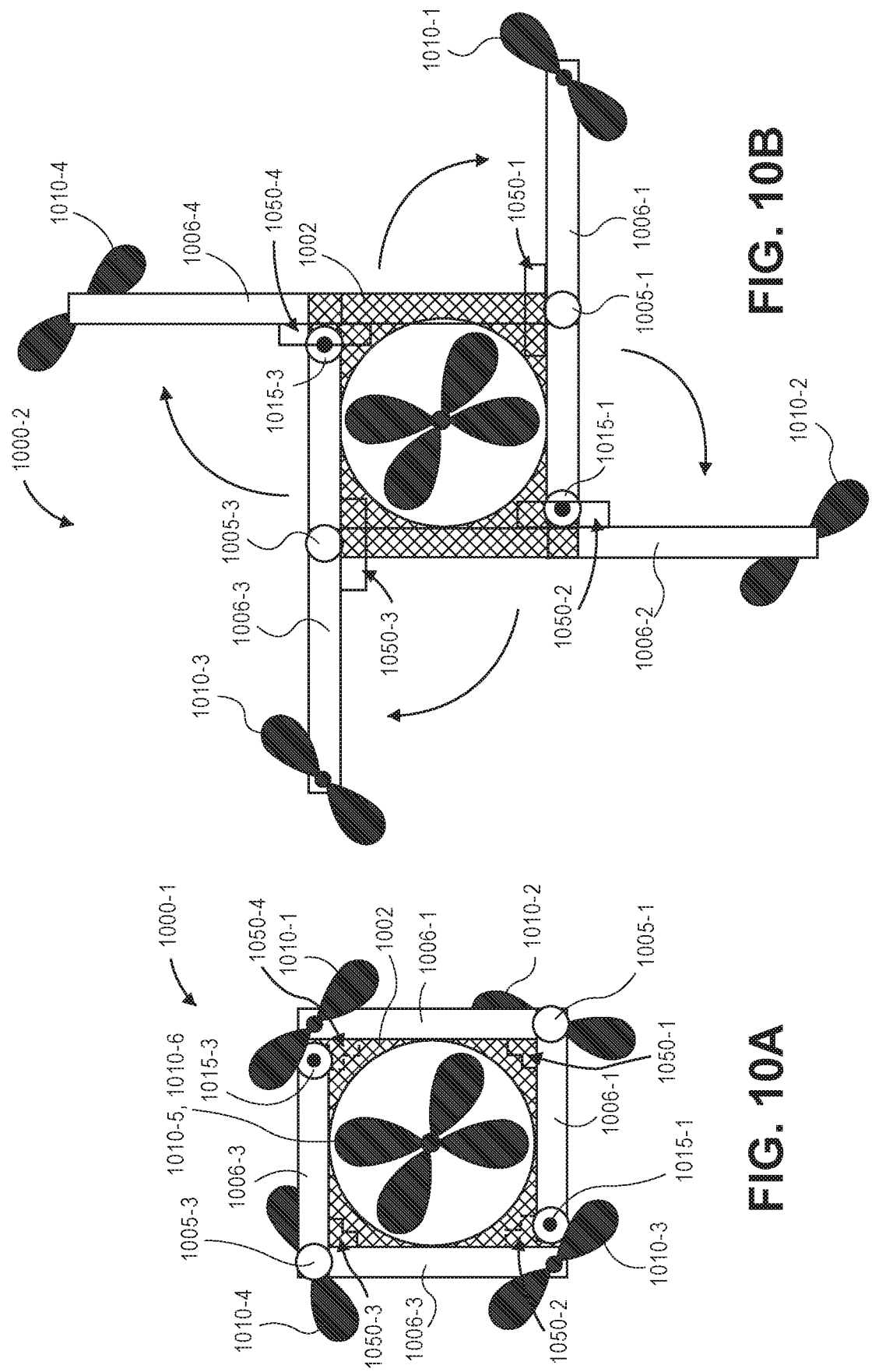

CONTROLLING AERIAL VEHICLE COMPONENTS USING SHAPE MEMORY ACTUATORS

BACKGROUND

Aerial vehicles, such as automated aerial vehicles or unmanned aerial vehicles, may generally include portions that are fixedly coupled to frames of the aerial vehicles, as well as other movable portions of the aerial vehicles that may be actuated by servos or motors. For example, motors, propellers, and other propulsion mechanisms of aerial vehicles may generally be fixedly coupled to the frames of the aerial vehicles, whereas control surfaces on wings of aerial vehicles may be actuated by servos or motors. However, servos or motors may add cost, weight, and complexity to aerial vehicles. Accordingly, there is a need for actuators that can actuate movable portions of aerial vehicles with decreased cost, weight, and complexity.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 10A and 10B are schematic diagrams of another example aerial vehicle having multiple arms and including shape memory actuators, according to an implementation.

Figure 1:
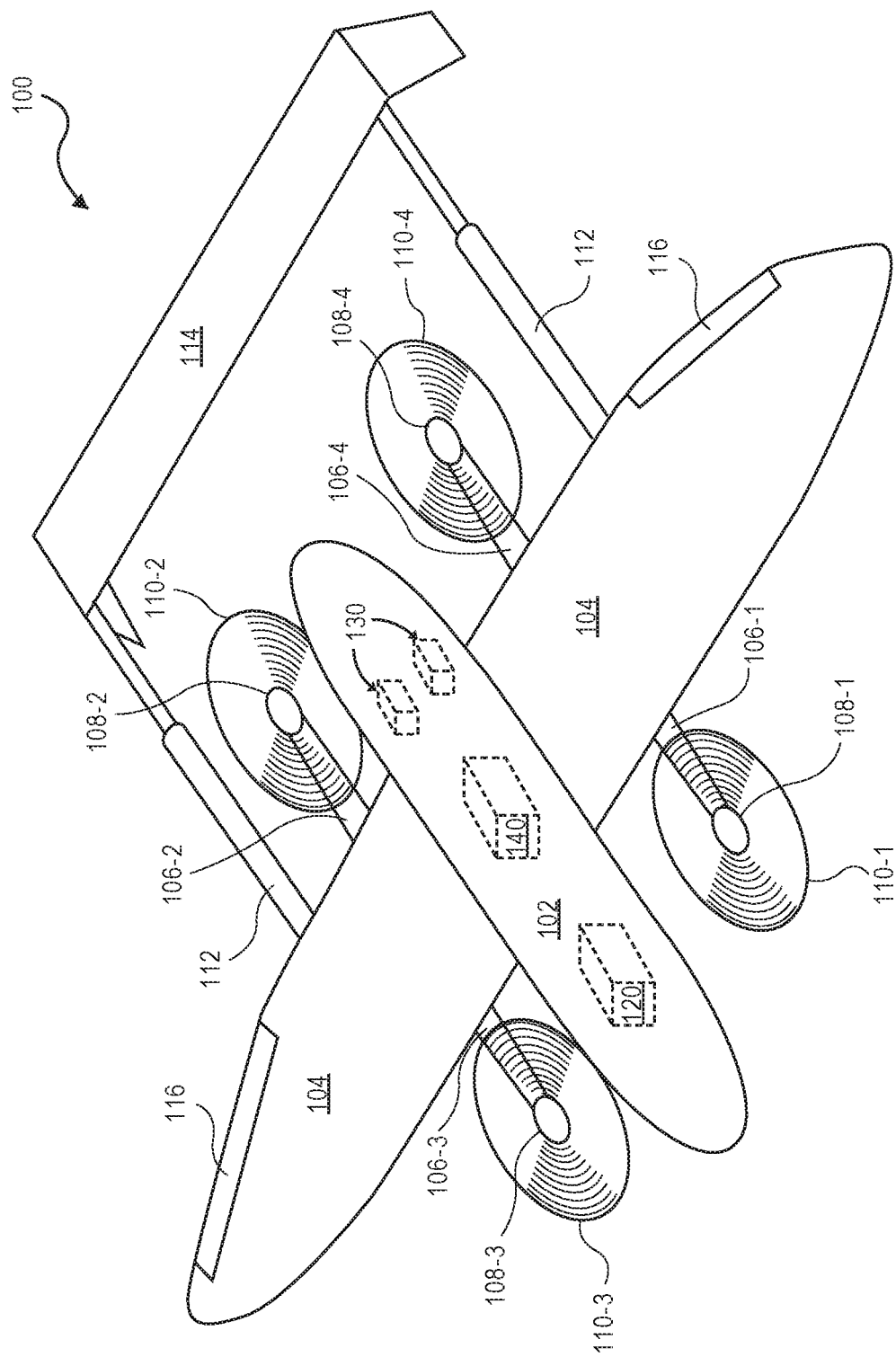
FIG. 1 is a schematic diagram of an example aerial vehicle including shape memory actuators, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Aerial vehicles, such as automated aerial vehicles or unmanned aerial vehicles, that utilize one or more shape memory actuators to move, adjust, or alter one or more components are described herein. The one or more shape memory actuators may be used to actuate various movable components or portions of the aerial vehicles. In addition, the one or more shape memory actuators may be formed from various types of shape memory materials and may be actuated by various methods.

In example embodiments, the one or more shape memory actuators may be used to move, adjust, or alter an orientation of one or more motors, propellers, and/or propulsion mechanisms. For example, a shape memory actuator may alter a cant angle or angular orientation of a motor and propeller along one axis. In addition, a plurality of shape memory actuators may alter the cant angle or angular orientation of a motor and propeller along multiple axes. In some example embodiments, the angular orientations of one or more propulsion mechanisms may be altered for different flight modes, e.g., vertical flight mode vs. horizontal flight mode, high speed vs. low speed, high altitude vs. low altitude, or other modes, and/or to increase, improve, or modify efficiency, stability, safety, thrust, acceleration, or other flight dynamics or characteristics.

The one or more shape memory actuators may be formed from shape memory alloys, shape memory polymers, magnetic shape memory alloys, or other shape memory materials. For example, the various shape memory actuators may expand and/or contract responsive to application of heat and/or responsive to application of magnetic fields. In addition, heat may be applied to the various shape memory actuators by passing a current through one or more sections of the shape memory actuators, by passing a current through one or more materials or wires placed adjacent or wrapped around one or more sections of the shape memory actuators, or by otherwise applying heat to one or more sections of the shape memory actuators. Further, magnetic fields may be applied to the various shape memory actuators by passing a current through one or more materials or wires placed adjacent or wrapped around one or more sections of the shape memory actuators, or by otherwise applying magnetic fields to one or more sections of the shape memory actuators.

In example embodiments, the one or more shape memory actuators may be one-way actuators or two-way actuators. One-way shape memory actuators may remember a single configuration or shape, whereas two-way shape memory actuators may remember two different configurations or shapes. For example, a one-way shape memory actuator having a first configuration or shape may be deformed or otherwise modified to a second configuration or shape, and responsive to application of heat or magnetic fields, the one-way shape memory actuator may return to the first configuration or shape. Generally, a one-way shape memory actuator may return to its first configuration or shape upon applying heat above a transformation temperature associated with a material of the shape memory actuator, or upon applying a first magnetic field to the material of the shape memory actuator. By contrast, a two-way shape memory actuator may have a first configuration or shape at a first temperature (e.g., below a transformation temperature associated with a material of the shape memory actuator) or in a presence of a first magnetic field, and the two-way shape memory actuator may have a second configuration or shape at a second temperature (e.g., above a transformation temperature associated with a material of the shape memory actuator) or in a presence of a second magnetic field.

In further example embodiments, shape memory actuators having more precise controllability may also be used to control components of aerial vehicles. For example, a plurality of sections of shape memory actuators may be connected in series, and each of the plurality of sections may be individually controllable. In some example embodiments, one or more sections of the shape memory actuators may be heated independently of other sections to control their configurations or shapes, one or more sections of the shape memory actuators may experience applied magnetic fields independently of other sections to control their configurations or shapes, and/or one or more sections of the shape memory actuators may experience applied currents independently of other sections to control their configurations or shapes. In further example embodiments, the shape memory actuators, such as a plurality of sections of shape memory actuators connected in series, may also be formed as part of or included within a base material, such that alteration of the configurations or shapes of one or more sections of the shape memory actuators may controllably alter an overall configuration or shape of the base material.

In other example embodiments, the one or more shape memory actuators may be used to move, adjust, or alter an orientation or position of various other components of aerial vehicles. For example, one or more wings or portions thereof, one or more control surfaces on wings, one or more sections or portions of frames, one or more arms or portions of arms connected to frames, one or more payload doors, one or more landing gears, and/or various other components may be moved, rotated, extended, retracted, opened, closed, or otherwise altered using one or more shape memory actuators.

FIG. 1 is a schematic diagram of an example aerial vehicle 100 including shape memory actuators, according to an implementation. The aerial vehicle 100 may include a frame or fuselage 102, a wing 104, one or more motor arms 106, one or more motors 108, one or more propellers 110, one or more boom arms 112, and/or a tail plane 114. Although a particular configuration of an aerial vehicle 100 is shown in FIG. 1, the shape memory actuators as described herein may be used with any other configuration of an aerial vehicle, including the other configurations of aerial vehicles shown in FIGS. 4, 8, 9, 10A, 10B, 11A and 11B herein, having at least one component that may be moved, adjusted, or altered relative to the frame or fuselage 102 or other portions of the aerial vehicle.

The frame or fuselage 102 may form a main or central body or portion of the aerial vehicle 100. The fuselage 102 may be formed of any suitable material, such as metal, plastic, carbon fiber, other materials, or combinations thereof. The fuselage 102 may have any shape, and may be shaped to reduce aerodynamic drag, for example. Various components may be housed or contained at least partially within the fuselage 102, including an aerial vehicle control system 120, one or more power supplies 130, a payload 140, as well as other electronic, avionic, operational, navigational and/or communication systems or components, sensor systems or components, controllers, processors, memory, and others. Connected to the fuselage 102 may be the wing 104, one or more motor arms 106, and/or one or more boom arms 112.

The wing 104 may extend from either side of the fuselage 102, or may be a single continuous wing 104 that is coupled to the fuselage 102. The wing 104 may be formed of any suitable material, such as metal, plastic, carbon fiber, other materials, or combinations thereof. The wing 104 may have a cross-sectional shape in the form of an airfoil to provide lift to the aerial vehicle 100 during generally horizontal flight. In addition, the wing 104 may include one or more ailerons, flaps, or other control surfaces 116 to control flight characteristics of the aerial vehicle 100. Connected to the wing 104 may be one or more motor arms 106, and/or one or more boom arms 112.

The one or more motor arms 106 may be coupled to and extend from one of the fuselage 102 or the wing 104. The motor arms 106 may be formed of any suitable material, such as metal, plastic, carbon fiber, other materials, or combinations thereof. The motor arms 106 may have any shape, and may be shaped to reduce aerodynamic drag, for example. Each motor arm 106 may include a motor 108 and corresponding propeller 110 along a portion of its length, e.g., at an end distal from a connection to the fuselage 102 or the wing 104.

Each of the motors 108 may rotate a corresponding propeller 110 to generate thrust for lifting and/or maneuvering the aerial vehicle 100. The motors 108 may be any suitable type of motor capable of generating, in combination with the corresponding propeller 110, thrust to lift and/or maneuver the aerial vehicle 100 or at least a portion of the aerial vehicle 100.

Each of the propellers 110 may include one or more blades that are rotated by the corresponding motor 108. Each of the blades of the propeller 110 may have a cross-sectional shape in the form of an airfoil to provide thrust to the aerial vehicle 100 during operation. In addition, the blades of the propeller 110 may be formed of any suitable material, such as metal, plastic, carbon fiber, other materials, or combinations thereof.

In the example aerial vehicle 100 shown in FIG. 1, four motor arms 106-1, 106-2, 106-3, 106-4 are coupled to and extend from one of the fuselage 102 or the wing 104, and each motor arm includes a motor 108-1, 108-2, 108-3, 108-4 and corresponding propeller 110-1, 110-2, 110-3, 110-4. Although the aerial vehicle 100 shown in FIG. 1 includes a particular number, combination, and arrangement of motor arms 106, motors 108, and propellers 110, any other number, combination, and arrangement of motor arms, motors, or propellers is possible. For example, the motor arms 106, motors 108, and propellers 110 may be coupled to the fuselage 102 or the wing 104 in various combinations of vertically downward facing and vertically upward facing motor arms, motors, and propellers, and/or in various symmetrical or non-symmetrical arrangements.

Further, any other types of propulsion mechanisms may be used in place of or in combination with those shown in FIG. 1, including fans, jets, turbojets, turbo fans, jet engines, electric jets, and the like, and/or combinations thereof. In addition, other configurations of aerial vehicles may not include motor arms 106, and instead, one or more of the motors 108 and propellers 110 may be connected directly to the frame or fuselage, the wing, or any other frame or body portions of the aerial vehicle.

The one or more boom arms 112 may be coupled to and extend from one of the fuselage 102 or the wing 104. Each boom arm 112 may couple to a portion of the tail plane 114 at an end distal from a connection to the fuselage 102 or the wing 104, and each boom arm 112 may extend forward of the fuselage 102 or the wing 104 as well. In some embodiments, one or more of the boom arms 112 and one or more of the motor arms 106 may be integrally formed, such that portions of the fuselage 102, wing 104, motors 108, propellers 110, and/or the tail plane 114 may all be coupled to the one or more boom arms 112. The boom arms 112 may be formed of any suitable material, such as metal, plastic, carbon fiber, other materials, or combinations thereof. The boom arms 112 may have any shape, and may be shaped to reduce aerodynamic drag, for example.

The tail plane 114 may be coupled to the one or more boom arms 112 and extend at least partially across a width of the aerial vehicle 100. The tail plane 114 may be formed of any suitable material, such as metal, plastic, carbon fiber, other materials, or combinations thereof. The tail plane 114 may have a cross-sectional shape in the form of an airfoil to provide lift to the aerial vehicle 100 during generally horizontal flight. In addition, the tail plane 114 may include one or more ailerons, flaps, or other control surfaces (not shown) to control flight characteristics of the aerial vehicle 100.

Further, any of the various shape memory actuators described herein may be utilized to selectively move, adjust, or alter at least one component, such as the wing 104, the control surfaces 116, the motor arms 106, the motors 108, the propellers 110, other propulsion mechanisms, the boom arms 112, and/or the tail plane 114, relative to the frame or fuselage 102 or other portions of the aerial vehicle.

For example, shape memory actuators may be used to move the wing 104, portions of the wing 104, the tail plane 114, or portions of the tail plane 114, such as extending or sweeping forward portions of the wing 104 or the tail plane 114 or retracting or sweeping backward portions of the wing 104 or the tail plane 114. In addition, shape memory actuators may also be used to actuate portions of the wing 104 or the tail plane 114 in other manners, such as raising, lowering, elongating, shortening, or otherwise changing angular orientations of portions of the wing 104 or the tail plane 114 relative to the frame or fuselage 102.

In addition, shape memory actuators may be used to move control surfaces 116 of the wing 104 or the tail plane 114, such as raising control surfaces 116 or lowering control surfaces 116. In addition, shape memory actuators may also be used to actuate control surfaces 116 of the wing 104 or the tail plane 114 in other manners, such as extending, elongating, retracting, or shortening control surfaces 116 of the wing 104 or the tail plane 114.

Further, shape memory actuators may be used to move motor arms 106 or boom arms 112, such as extending or retracting the motor arms 106 or the boom arms 112. In addition, shape memory actuators may also be used to actuate motor arms 106 or boom arms 112 in other manners, such as raising, lowering, elongating, shortening, or otherwise changing angular orientations of the motor arms 106 or the boom arms 112 relative to the frame or fuselage 102.

Moreover, shape memory actuators may be used to move motors 108, propellers 110, or other propulsion mechanisms, such as altering angular orientations of the motors 108, propellers 110, or other propulsion mechanisms relative to the frame or fuselage 102. In addition, shape memory actuators may also be used to actuate motors 108, propellers 110, or other propulsion mechanisms in other manners, such as raising, lowering, translating, or otherwise changing positions or angular orientations of the motors 108, propellers 110, or other propulsion mechanisms relative to the frame or fuselage 102.

Further, shape memory actuators may be used to move payload doors or landing gears (not shown), such as opening or closing the payload doors or extending or retracting the landing gears. In addition, shape memory actuators may also be used to actuate payload doors or landing gears in other manners, such as rotating, translating, or otherwise changing positions or angular orientations of the payload doors, or elongating, shortening, or otherwise changing positions or angular orientations of the landing gears relative to the frame or fuselage 102.

Furthermore, although shape memory actuators are described herein in the context of moving, adjusting, or altering various components of aerial vehicles, any other components of aerial vehicles may also be moved, adjusted, or altered using shape memory actuators, such as components internal to a frame or fuselage 102 including control systems 120, power supplies 130, payloads 140, other electronic components, sensors, and any other components. For example, various components internal to the fuselage 102 may be moved, adjusted, or altered for various reasons or purposes, including altering weight distribution, affecting flight dynamics or characteristics, releasing or securing internal components, or other purposes.

The one or more shape memory actuators may be formed from shape memory alloys, shape memory polymers, magnetic shape memory alloys, or other shape memory materials. For example, the various shape memory actuators may expand and/or contract responsive to application of heat and/or responsive to application of magnetic fields. In addition, heat may be applied to the various shape memory actuators by passing a current through one or more sections of the shape memory actuators, by passing a current through one or more materials or wires placed adjacent or wrapped around one or more sections of the shape memory actuators, or by otherwise applying heat to one or more sections of the shape memory actuators. Further, magnetic fields may be applied to the various shape memory actuators by passing a current through one or more materials or wires placed adjacent or wrapped around one or more sections of the shape memory actuators, or by otherwise applying magnetic fields to one or more sections of the shape memory actuators.

Example shape memory alloys may include copper-aluminum-nickel, nickel-titanium (Nitinol, Flexinol), or other alloys. Example magnetic shape memory alloys may include nickel-manganese-gallium, nickel-iron-gallium, or other alloys. Example shape memory polymers may include polyurethane, polyethylene terephthalate, polyethylene oxide, polystyrene, polybutadiene, or other polymers.

In example embodiments, the one or more shape memory actuators may be one-way actuators or two-way actuators. One-way shape memory actuators may remember a single configuration or shape, whereas two-way shape memory actuators may remember two different configurations or shapes. For example, a one-way shape memory actuator having a first configuration or shape may be deformed or otherwise modified to a second configuration or shape, and responsive to application of heat or magnetic fields, the one-way shape memory actuator may return to the first configuration or shape. Generally, a one-way shape memory actuator may return to its first configuration or shape upon applying heat above a transformation temperature associated with a material of the shape memory actuator, or upon applying a first magnetic field to the material of the shape memory actuator. By contrast, a two-way shape memory actuator may have a first configuration or shape at a first temperature (e.g., below a transformation temperature associated with a material of the shape memory actuator) or in a presence of a first magnetic field, and the two-way shape memory actuator may have a second configuration or shape at a second temperature (e.g., above a transformation temperature associated with a material of the shape memory actuator) or in a presence of a second magnetic field that is different from the first magnetic field.

For shape memory alloys, the transformation temperature may be associated with a transition between the martensite phase and the austenite phase of the material of the shape memory alloys. For magnetic shape memory alloys, the configuration or shape change may be caused by magnetically induced reorientation within the martensite phase associated with the material of the magnetic shape memory alloys. For shape memory polymers, the transformation temperature may be associated with a transition between a hard phase and a soft phase of the material of the shape memory polymers.

The one or more shape memory actuators may comprise wires, strands, coils, or other groups or combinations of shape memory materials. In some example embodiments, multiple wires or strands of the same or different shape memory materials may be combined, bunched, coiled, or wrapped into a group to form a rope, wire, rod, beam, or column of larger diameter or size, and/or a relatively solid configuration or shape, such that the resulting shape memory actuator may substantially maintain one or more configurations or shapes in the absence of external forces or deformation.

For example, a one-way shape memory actuator may remember a first configuration, e.g., a substantially straight shape with a defined length. During use, the one-way shape memory actuator may be physically deformed or altered to a second configuration, such as by stretching, compressing, bending, or other physical deformations that alter the shape and/or length of the one-way shape memory actuator. Upon application of heat above a transformation temperature associated with a material of the one-way shape memory actuator, and/or upon application of a first magnetic field associated with the material of the one-way shape memory actuator, the one-way shape memory actuator may return back to the first configuration, e.g., a substantially straight shape with a defined length, from the second, deformed configuration, e.g., a bent shape and/or a shorter or longer length. Although this example refers to a one-way shape memory actuator that remembers a first configuration that is a substantially straight shape with a defined length, one-way shape memory actuators may remember other types of first configurations, including U-shapes, Z-shapes, other bent shapes, and/or shapes with various lengths.

In addition, a two-way shape memory actuator may remember both a first configuration, e.g., a substantially straight shape with a first defined length, and a second configuration, e.g., a bent, U-shape with a second defined length. During use, the two-way shape memory actuator may initially begin with the first configuration, e.g., a substantially straight shape with a first defined length. Upon application of heat above a transformation temperature associated with a material of the two-way shape memory actuator, and/or upon application of a second magnetic field associated with the material of the two-way shape memory actuator, the two-way shape memory actuator may alter its configuration to the second configuration, e.g., a bent, U-shape with a second defined length. Then, upon removal of heat below the transformation temperature associated with the material of the two-way shape memory actuator, and/or upon application of a first magnetic field that is different from the second magnetic field associated with the material of the two-way shape memory actuator, the two-way shape memory actuator may return back to the first configuration, e.g., a substantially straight shape with a defined length, from the second configuration, e.g., a bent, U-shape with a second defined length. Although this example refers to a two-way shape memory actuator that remembers both a first configuration that is a substantially straight shape with a defined length and a second configuration that is a bent, U-shape with a second defined length, two-way shape memory actuators may remember other types and combinations of first configurations and second configurations, including straight shapes, U-shapes, Z-shapes, other bent shapes, and/or shapes with various lengths. Further, other example shape memory actuators that may be included in the example embodiments described herein may remember more than two particular configurations.

As shown in FIG. 1, the aerial vehicle control system 120 may control the operation of various components of the aerial vehicle 100, including the motors 108 and corresponding propellers 110 or other propulsion mechanisms, shape memory actuators as described herein, any electronic, avionic, operational, navigational and/or communication systems or components, sensor systems or components, controllers, processors, and other components of the aerial vehicle 100. For example, the aerial vehicle control system 120 may transmit instructions to the motors 108 and corresponding propellers 110 (and/or other propulsion mechanisms) to control flight and navigation of the aerial vehicle 100, may transmit instructions to monitor operation, location, flight path, and/or an environment of the aerial vehicle 100, e.g., using electronic, avionic, operational, navigational, communication, and/or sensor systems or components, and/or may transmit instructions to move, adjust, or alter at least one component, e.g., using shape memory actuators. While the aerial vehicle control system 120 is shown in FIG. 1 at a particular location on aerial vehicle 100, the aerial vehicle control system 120 may be positioned at any suitable location on aerial vehicle 100.

In addition, the aerial vehicle control system 120 may communicate (via wired or wireless communication) with one or more other aerial vehicles and/or with an aerial vehicle management system or control station in order to receive and/or transmit data and information. As discussed in further detail with respect to FIG. 12, the aerial vehicle control system 120 may control at least the operation, routing, navigation, and communication of the aerial vehicle 100.

The sensor systems or components (not shown) of the aerial vehicle 100 may include image capture devices, infrared sensors, thermal sensors, time of flight sensors, radar sensors, LIDAR sensors, accelerometers, altitude sensors, pressure sensors, weather sensors, GPS (Global Positioning System) sensors, and/or other sensors. The data and information received, processed, and/or analyzed by the sensor systems may be used by the aerial vehicle control system 120 to control at least the operation, routing, navigation, and communication of the aerial vehicle 100. For example, the aerial vehicle control system 120 may use the data and information received, processed, and/or analyzed by the sensor systems to monitor operation, location, flight path, and/or an environment of the aerial vehicle 100, and to control the movement, adjustment, or alteration of at least one component using shape memory actuators based on the data and information.

The one or more power supplies 130 may include a battery, capacitor, or any other electrical energy storage component to provide power to the motors 108 or other propulsion mechanisms, shape memory actuators as described herein, any electronic, avionic, operational, navigational and/or communication systems or components, sensor systems or components, controllers, processors, and other components of the aerial vehicle 100. While the power supplies 130 are shown in FIG. 1 at particular locations on aerial vehicle 100, the power supplies 130 may be positioned at any suitable locations on aerial vehicle 100.

The payload 140 may be any suitable item, object, apparatus, or component to be acquired, carried, delivered, and/or released by the aerial vehicle 100. For example, the payload 140 may be an item ordered by a customer to be delivered by the aerial vehicle 100 to a location associated with the customer, or any other location associated with the delivery. The payload 140 may be acquired, carried, and/or released by any suitable payload engagement mechanism of the aerial vehicle 100, including access doors, grasping mechanisms having opening/closing arms or digits, suction mechanisms, electro-adhesion mechanisms, magnetic attachment mechanisms, roller- or conveyor-type mechanisms, and the like. While the payload 140 is shown in FIG. 1 at a particular location on aerial vehicle 100, the payload 140 may be positioned at any suitable location on aerial vehicle 100.

Figure 2A:
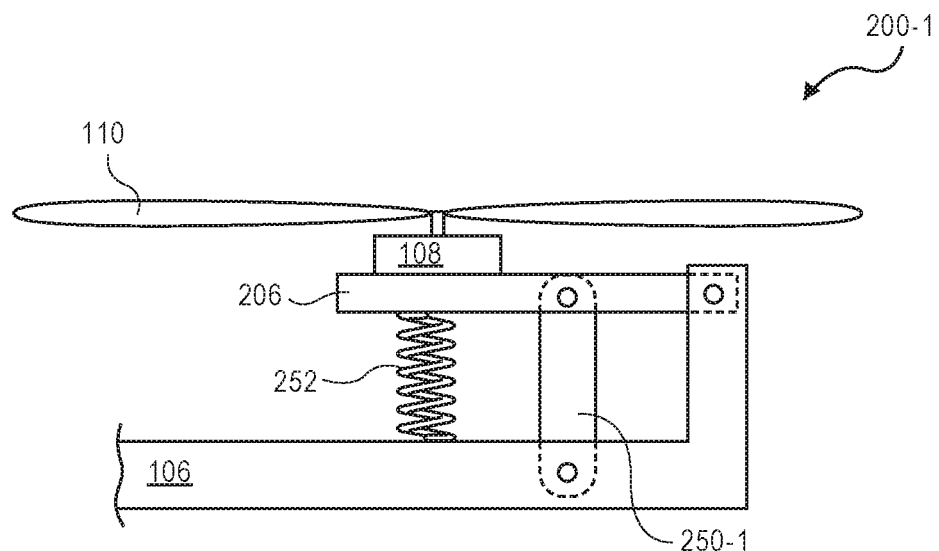
FIG. 2A is a schematic diagram of an example propulsion mechanism of an example aerial vehicle including shape memory actuators, according to an implementation.

FIG. 2A is a schematic diagram 200-1 of an example propulsion mechanism of an example aerial vehicle including shape memory actuators, according to an implementation.

As shown in FIG. 2A, the example propulsion mechanism may include a motor arm 106, a motor 108, and a propeller 110. In addition, the example propulsion mechanism may also include a motor arm extension 206 that is movably or pivotably mounted to the motor arm 106.

For example, the motor arm extension 206 may be pivotably mounted to a portion of the motor arm 106, and the motor 108 and propeller 110 may be mounted to a portion of the motor arm extension 206. In addition, a shape memory actuator 250-1, e.g., a one-way shape memory actuator, may be coupled between portions of the motor arm 106 and the motor arm extension 206. Further, a bias element 252, e.g., a spring, counterweight, or other resilient member, may also be coupled between portions of the motor arm 106 and the motor arm extension 206.

In example embodiments, the bias element 252 may be a compression spring member that applies a force to the motor arm extension 206 that causes separation, increases the distance, or otherwise causes movement between the motor arm extension 206 and the motor arm 106. In addition, the shape memory actuator 250-1 may contract and return to a first configuration, e.g., having a first shape and/or first defined length, upon application of heat above a transformation temperature associated with a material of the shape memory actuator 250-1 or upon application of a magnetic field to the material of the shape memory actuator 250-1. In this manner, the motor arm extension 206 may be moved or pivoted relative to the motor arm 106 to move, adjust, or alter a position or angular orientation of the motor 108 and propeller 110 relative to a frame or other portions of the aerial vehicle.

Based at least in part on a design and/or selection of a bias element 252, e.g., compression spring member, that applies a defined force to the motor arm extension 206, and a design and/or selection of a shape memory actuator 250-1 having a desired tensile strength and a desired first configuration, e.g., with a first shape and/or first defined length, the motor 108 and propeller 110 may be moved between two defined positions and/or angular orientations. For example, in a first position and/or first angular orientation, the bias element 252 may increase the distance between the motor arm extension 206 and the motor arm 106 and elongate or stretch the shape memory actuator 250-1 such that the motor 108 and propeller 110 are at the first position and/or first angular orientation. In a second position and/or second angular orientation, the shape memory actuator 250-1 may contract and return to the first configuration, e.g., with a first shape and/or first defined length, and compress, bend, or otherwise deform the bias element 252 such that the motor 108 and propeller 110 are at the second position and/or second angular orientation.

In alternative example embodiments, the bias element 252 may be an extension spring member that applies a force to the motor arm extension 206 that decreases the distance, or otherwise causes movement between the motor arm extension 206 and the motor arm 106. In addition, the shape memory actuator 250-1 may extend and return to a first configuration, e.g., having a first shape and/or first defined length, upon application of heat above a transformation temperature associated with a material of the shape memory actuator 250-1 or upon application of a magnetic field to the material of the shape memory actuator 250-1. In this manner, the motor arm extension 206 may be moved or pivoted relative to the motor arm 106 to move, adjust, or alter a position or angular orientation of the motor 108 and propeller 110 relative to a frame or other portions of the aerial vehicle.

Based at least in part on a design and/or selection of a bias element 252, e.g., extension spring member, that applies a defined force to the motor arm extension 206, and a design and/or selection of a shape memory actuator 250-1 having a desired tensile strength and a desired first configuration, e.g., with a first shape and/or first defined length, the motor 108 and propeller 110 may be moved between two defined positions and/or angular orientations. For example, in a first position and/or first angular orientation, the bias element 252 may decrease the distance between the motor arm extension 206 and the motor arm 106 and compress, bend, or otherwise deform the shape memory actuator 250-1 such that the motor 108 and propeller 110 are at the first position and/or first angular orientation. In a second position and/or second angular orientation, the shape memory actuator 250-1 may extend and return to the first configuration, e.g., with a first shape and/or first defined length, and elongate or stretch the bias element 252 such that the motor 108 and propeller 110 are at the second position and/or second angular orientation.

Figure 2B:
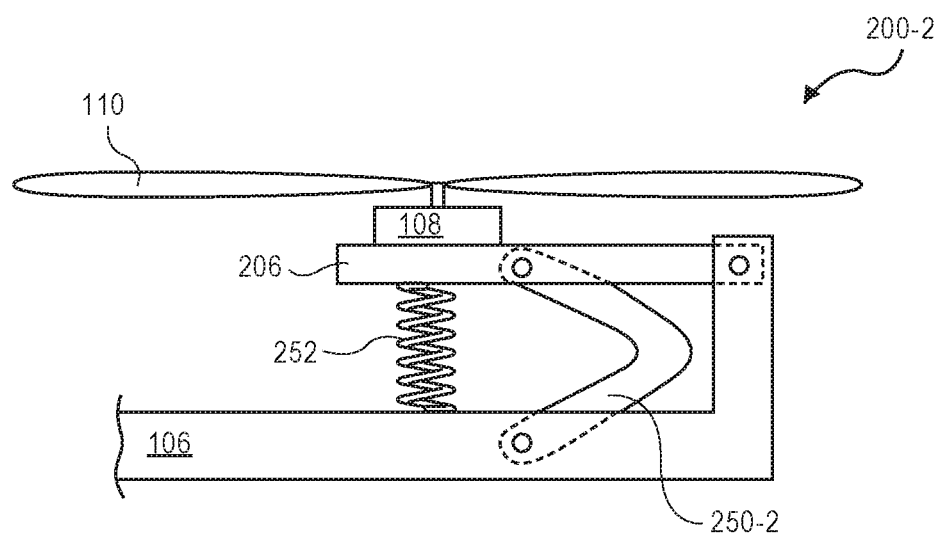
FIG. 2B is a schematic diagram of another example propulsion mechanism of an example aerial vehicle including shape memory actuators, according to an implementation.

FIG. 2B is a schematic diagram 200-2 of another example propulsion mechanism of an example aerial vehicle including shape memory actuators, according to an implementation.

As shown in FIG. 2B, the example propulsion mechanism may include a motor arm 106, a motor 108, and a propeller 110. In addition, the example propulsion mechanism may also include a motor arm extension 206 that is movably or pivotably mounted to the motor arm 106.

For example, the motor arm extension 206 may be pivotably mounted to a portion of the motor arm 106, and the motor 108 and propeller 110 may be mounted to a portion of the motor arm extension 206. In addition, a shape memory actuator 250-2, e.g., a one-way shape memory actuator having a U-shape, may be coupled between portions of the motor arm 106 and the motor arm extension 206. Further, a bias element 252, e.g., a spring, counterweight, or other resilient member, may also be coupled between portions of the motor arm 106 and the motor arm extension 206.

In example embodiments, the bias element 252 may be a compression spring member that applies a force to the motor arm extension 206 that causes separation, increases the distance, or otherwise causes movement between the motor arm extension 206 and the motor arm 106. In addition, the shape memory actuator 250-2 may contract and return to a first configuration, e.g., having a U-shape and first defined length, upon application of heat above a transformation temperature associated with a material of the shape memory actuator 250-2 or upon application of a magnetic field to the material of the shape memory actuator 250-2. In this manner, the motor arm extension 206 may be moved or pivoted relative to the motor arm 106 to move, adjust, or alter a position or angular orientation of the motor 108 and propeller 110 relative to a frame or other portions of the aerial vehicle.

Based at least in part on a design and/or selection of a bias element 252, e.g., compression spring member, that applies a defined force to the motor arm extension 206, and a design and/or selection of a shape memory actuator 250-2 having a desired tensile strength and a desired first configuration, e.g., with a U-shape and first defined length, the motor 108 and propeller 110 may be moved between two defined positions and/or angular orientations. For example, in a first position and/or first angular orientation, the bias element 252 may increase the distance between the motor arm extension 206 and the motor arm 106 and elongate or stretch the shape memory actuator 250-2, e.g., by straightening out the U-shape, such that the motor 108 and propeller 110 are at the first position and/or first angular orientation. In a second position and/or second angular orientation, the shape memory actuator 250-2 may contract and return to the first configuration, e.g., with a U-shape and first defined length, and compress the bias element 252 such that the motor 108 and propeller 110 are at the second position and/or second angular orientation.

In alternative example embodiments, the bias element 252 may be an extension spring member that applies a force to the motor arm extension 206 that decreases the distance, or otherwise causes movement between the motor arm extension 206 and the motor arm 106. In addition, the shape memory actuator 250-2 may extend and return to a first configuration, e.g., having a U-shape and first defined length, upon application of heat above a transformation temperature associated with a material of the shape memory actuator 250-2 or upon application of a magnetic field to the material of the shape memory actuator 250-2. In this manner, the motor arm extension 206 may be moved or pivoted relative to the motor arm 106 to move, adjust, or alter a position or angular orientation of the motor 108 and propeller 110 relative to a frame or other portions of the aerial vehicle.

Based at least in part on a design and/or selection of a bias element 252, e.g., extension spring member, that applies a defined force to the motor arm extension 206, and a design and/or selection of a shape memory actuator 250-2 having a desired tensile strength and a desired first configuration, e.g., with a U-shape and first defined length, the motor 108 and propeller 110 may be moved between two defined positions and/or angular orientations. For example, in a first position and/or first angular orientation, the bias element 252 may decrease the distance between the motor arm extension 206 and the motor arm 106 and compress the shape memory actuator 250-2, e.g., by closing or further bending the U-shape, such that the motor 108 and propeller 110 are at the first position and/or first angular orientation. In a second position and/or second angular orientation, the shape memory actuator 250-2 may extend and return to the first configuration, e.g., with a U-shape and first defined length, and elongate or stretch the bias element 252 such that the motor 108 and propeller 110 are at the second position and/or second angular orientation.

In further example embodiments, one or more limits or stops may be included in the propulsion mechanisms of FIGS. 2A and 2B, in order to further define one or more position limits to which the propulsion mechanisms may be moved. For example, one or more limits or stops may define a first position and/or first angular orientation of the motor and propeller, e.g., a vertical flight orientation, and one or more other limits or stops may define a second position and/or second angular orientation of the motor and propeller, e.g., a horizontal flight orientation. In other embodiments, the one or more limits or stops may define various positions or angular orientations other than positions or angular orientations associated with vertical flight or horizontal flight, as desired.

In still further example embodiments, the propulsion mechanisms of FIGS. 2A and 2B may include two-way shape memory actuators instead of one-way shape memory actuators, and the bias elements 252 may be removed from the propulsion mechanisms. In such examples, application of heat or first magnetic fields to the two-way shape memory actuators may move the motor and propeller to a first position or angular orientation, and removal of heat or application of second magnetic fields to the two-way shape memory actuators may move the motor and propeller to a second position or angular orientation.

Although FIGS. 2A and 2B show particular configurations of a motor arm 106 and motor arm extension 206 to which a motor 108 and propeller 110 are mounted, the motor arm 106 and motor arm extension 206 may also include other configurations or structures that facilitate movement, adjustment, or alteration of a position and/or angular orientation of the motor 108 and propeller 110 relative to a frame or other portions of an aerial vehicle. For example, other movable or pivotable connections may include hinged connections, rotatable connections, ball and socket connections, multiple arm linkage connections, sliding connections, telescoping connections, scissor lift connections, or other types of connections.

Furthermore, in example embodiments having shape memory actuators that respond to changes in temperature, e.g., application of heat or removal of heat, the configurations or structures that facilitate movement of a component relative to a frame or other portions of an aerial vehicle and/or other structures or components positioned adjacent the shape memory actuators may be designed to direct airflow or provide cooling to the shape memory actuators in one or more configurations of the actuators. For example, for a shape memory actuator that contracts in length to a first configuration upon application of heat and extends in length to a second configuration upon removal of heat, the surrounding structures or components of the aerial vehicle may be configured to direct more airflow or provide greater cooling in one or both of these configurations. In one example embodiment, more airflow may be directed toward the shape memory actuator in the second configuration upon removal of heat to maintain the second configuration. In an alternative example embodiment, more airflow may be directed toward the shape memory actuator in the first configuration upon application of heat to facilitate a faster transition to the second configuration upon removal of heat. The application of heat, e.g., an amount of applied current or heat, to the shape memory actuator may be selected or controlled based at least in part on an understanding of the airflow or cooling that will be directed to the shape memory actuator by the surrounding structures or components to facilitate effective transitions between the first and second configurations. In still further example embodiments, dedicated or directed cooling may be selectively provided to the shape memory actuators to remove heat, such as by adjacent tubes, pipes, other conduits, or other heat transfer media, through which cooling fluids, e.g., liquids or gases, may flow to effect heat transfer between the shape memory actuators and cooling fluids.

In addition, although FIGS. 2A and 2B show particular locations of shape memory actuators and bias elements, other locations of shape memory actuators and bias elements may also be included in the example propulsion mechanisms described herein. Further, although FIGS. 2A and 2B show particular types or configurations of bias elements, other types or configurations of bias elements, e.g., compression springs, extension springs, torsional springs, leaf springs, or other types of bias elements, may also be included in the example propulsion mechanisms described herein. Alternatively or in addition to particular components or structural elements that may act as bias elements, in some example embodiments, airflow, wind, gravity, navigational maneuvers (e.g., accelerating, decelerating, spinning, etc.), or other aspects related to flight operations or dynamics of an aerial vehicle may exert one or more forces on portions of the aerial vehicle, such as the shape memory actuators or other portions connected to the shape memory actuators, thereby effectively acting as additional types of bias elements. Moreover, although FIGS. 2A and 2B show shape memory actuators having particular configurations, e.g., substantially straight or U-shaped, the shape memory actuators described herein may also include other configurations, such as V-shapes, Z-shapes, W-shapes, other shapes, and/or other lengths.

Figure 3A:
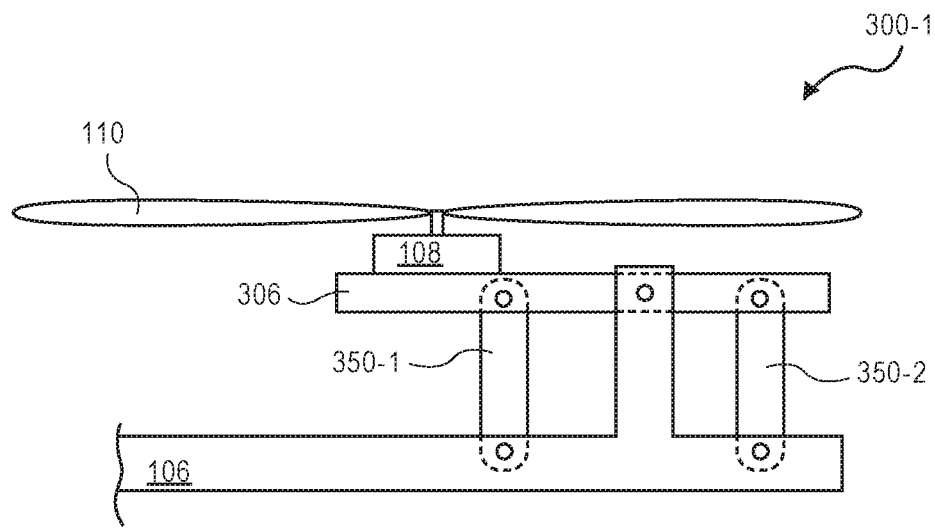
FIG. 3A is a schematic diagram of another example propulsion mechanism of an example aerial vehicle including shape memory actuators, according to an implementation.

FIG. 3A is a schematic diagram 300-1 of another example propulsion mechanism of an example aerial vehicle including shape memory actuators, according to an implementation.

As shown in FIG. 3A, the example propulsion mechanism may include a motor arm 106, a motor 108, and a propeller 110. In addition, the example propulsion mechanism may also include a motor arm extension 306 that is movably or pivotably mounted to the motor arm 106.

For example, the motor arm extension 306 may be pivotably mounted to a portion of the motor arm 106, and the motor 108 and propeller 110 may be mounted to a portion of the motor arm extension 306. In addition, two or more shape memory actuators 350-1, 350-2, e.g., one-way shape memory actuators, may be coupled between portions of the motor arm 106 and the motor arm extension 306. In the example shown in FIG. 3A, the two shape memory actuators 350-1, 350-2 may be coupled to the motor arm extension 306 on opposite sides of the movable or pivotable connection to the motor arm 106.

In example embodiments, a first shape memory actuator 350-1 may contract and return to a first configuration, e.g., having a first shape and/or first defined length, upon application of heat above a transformation temperature associated with a material of the shape memory actuator 350-1 or upon application of a magnetic field to the material of the shape memory actuator 350-1. Similarly, a second shape memory actuator 350-2 may contract and return to a second configuration, e.g., having a second shape and/or second defined length, upon application of heat above a transformation temperature associated with a material of the shape memory actuator 350-2 or upon application of a magnetic field to the material of the shape memory actuator 350-2. In this manner, the motor arm extension 306 may be moved or pivoted relative to the motor arm 106 to move, adjust, or alter a position or angular orientation of the motor 108 and propeller 110 relative to a frame or other portions of the aerial vehicle.

Based at least in part on design and/or selection of the shape memory actuators 350-1, 350-2 having desired tensile strengths and desired first and second configurations, e.g., with first and second shapes and/or first and second defined lengths, the motor 108 and propeller 110 may be moved between two defined positions and/or angular orientations. For example, in a first position and/or first angular orientation, the first shape memory actuator 350-1 may contract and return to the first configuration, e.g., with a first shape and/or first defined length, to decrease the distance between the motor arm extension 306 and the motor arm 106 on a first side of the pivotable connection and elongate or stretch the second shape memory actuator 350-2 such that the motor 108 and propeller 110 are at the first position and/or first angular orientation. In a second position and/or second angular orientation, the second shape memory actuator 350-2 may contract and return to the second configuration, e.g., with a second shape and/or second defined length, to decrease the distance between the motor arm extension 306 and the motor arm 106 on a second side of the pivotable connection and elongate or stretch the first shape memory actuator 350-1 such that the motor 108 and propeller 110 are at the second position and/or second angular orientation.

In alternative example embodiments, in a first position and/or first angular orientation, the first shape memory actuator 350-1 may extend and return to the first configuration, e.g., with a first shape and/or first defined length, to increase the distance between the motor arm extension 306 and the motor arm 106 on a first side of the pivotable connection and compress or deform the second shape memory actuator 350-2 such that the motor 108 and propeller 110 are at the first position and/or first angular orientation. In a second position and/or second angular orientation, the second shape memory actuator 350-2 may extend and return to the second configuration, e.g., with a second shape and/or second defined length, to increase the distance between the motor arm extension 306 and the motor arm 106 on a second side of the pivotable connection and compress or deform the first shape memory actuator 350-1 such that the motor 108 and propeller 110 are at the second position and/or second angular orientation.

Figure 3B:
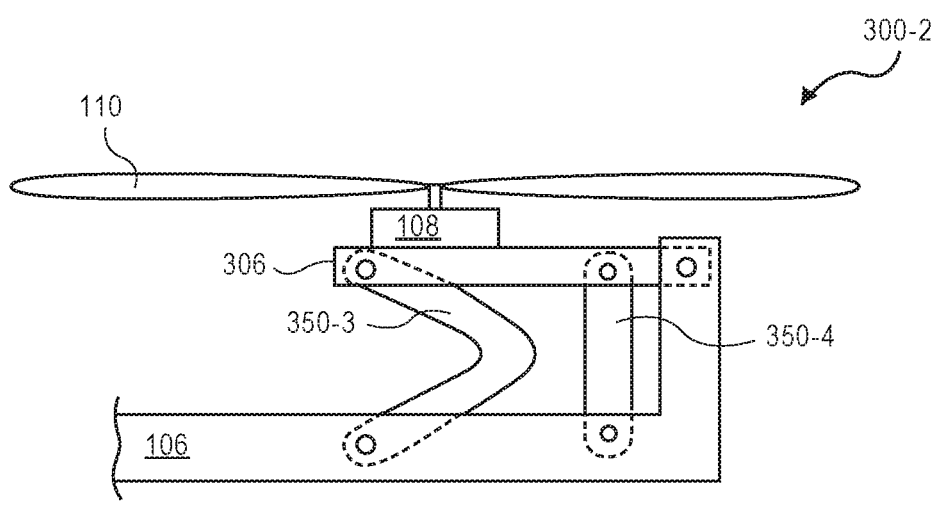
FIG. 3B is a schematic diagram of another example propulsion mechanism of an example aerial vehicle including shape memory actuators, according to an implementation.

FIG. 3B is a schematic diagram 300-2 of another example propulsion mechanism of an example aerial vehicle including shape memory actuators, according to an implementation.

As shown in FIG. 3B, the example propulsion mechanism may include a motor arm 106, a motor 108, and a propeller 110. In addition, the example propulsion mechanism may also include a motor arm extension 306 that is movably or pivotably mounted to the motor arm 106.

For example, the motor arm extension 306 may be pivotably mounted to a portion of the motor arm 106, and the motor 108 and propeller 110 may be mounted to a portion of the motor arm extension 306. In addition, two or more shape memory actuators 350-3, 350-4, e.g., one-way shape memory actuators, may be coupled between portions of the motor arm 106 and the motor arm extension 306. In the example shown in FIG. 3B, the two shape memory actuators 350-3, 350-4 may be coupled to the motor arm extension 306 on a same side of the movable or pivotable connection to the motor arm 106.

In example embodiments, a third shape memory actuator 350-3 may contract and return to a third configuration, e.g., having a third shape and/or third defined length, upon application of heat above a transformation temperature associated with a material of the shape memory actuator 350-3 or upon application of a magnetic field to the material of the shape memory actuator 350-3. Similarly, a fourth shape memory actuator 350-4 may extend and return to a fourth configuration, e.g., having a fourth shape and/or fourth defined length, upon application of heat above a transformation temperature associated with a material of the shape memory actuator 350-4 or upon application of a magnetic field to the material of the shape memory actuator 350-4. In this manner, the motor arm extension 306 may be moved or pivoted relative to the motor arm 106 to move, adjust, or alter a position or angular orientation of the motor 108 and propeller 110 relative to a frame or other portions of the aerial vehicle.

Based at least in part on design and/or selection of the shape memory actuators 350-3, 350-4 having desired tensile strengths and desired third and fourth configurations, e.g., with third and fourth shapes and/or third and fourth defined lengths, the motor 108 and propeller 110 may be moved between two defined positions and/or angular orientations. For example, in a first position and/or first angular orientation, the third shape memory actuator 350-3 may contract and return to the third configuration, e.g., with a third shape and/or third defined length, to decrease the distance between the motor arm extension 306 and the motor arm 106 and compress or deform the fourth shape memory actuator 350-4 such that the motor 108 and propeller 110 are at the first position and/or first angular orientation. In a second position and/or second angular orientation, the fourth shape memory actuator 350-4 may extend and return to the fourth configuration, e.g., with a fourth shape and/or fourth defined length, to increase the distance between the motor arm extension 306 and the motor arm 106 and elongate or stretch the third shape memory actuator 350-3 such that the motor 108 and propeller 110 are at the second position and/or second angular orientation.

In alternative example embodiments, in a first position and/or first angular orientation, the third shape memory actuator 350-3 may extend and return to the third configuration, e.g., with a third shape and/or third defined length, to increase the distance between the motor arm extension 306 and the motor arm 106 and elongate or stretch the fourth shape memory actuator 350-4 such that the motor 108 and propeller 110 are at the first position and/or first angular orientation. In a second position and/or second angular orientation, the fourth shape memory actuator 350-4 may contract and return to the fourth configuration, e.g., with a fourth shape and/or fourth defined length, to decrease the distance between the motor arm extension 306 and the motor arm 106 and compress or deform the third shape memory actuator 350-3 such that the motor 108 and propeller 110 are at the second position and/or second angular orientation.

In further example embodiments, one or more limits or stops may be included in the propulsion mechanisms of FIGS. 3A and 3B, in order to further define one or more position limits to which the propulsion mechanisms may be moved. For example, one or more limits or stops may define a first position and/or first angular orientation of the motor and propeller, e.g., a vertical flight orientation, and one or more other limits or stops may define a second position and/or second angular orientation of the motor and propeller, e.g., a horizontal flight orientation. In other embodiments, the one or more limits or stops may define various positions or angular orientations other than positions or angular orientations associated with vertical flight or horizontal flight, as desired.

In still further example embodiments, the propulsion mechanisms of FIGS. 3A and 3B may include two-way shape memory actuators instead of one-way shape memory actuators. In such examples, application of heat or first magnetic fields to a first set of the two-way shape memory actuators and/or removal of heat or application of second magnetic fields to a second set of the two-way shape memory actuators may move the motor and propeller to a first position or angular orientation, and application of heat or first magnetic fields to the second set of the two-way shape memory actuators and/or removal of heat or application of second magnetic fields to the first set of the two-way shape memory actuators may move the motor and propeller to a second position or angular orientation.

Although FIGS. 3A and 3B show particular configurations of a motor arm 106 and motor arm extension 306 to which a motor 108 and propeller 110 are mounted, the motor arm 106 and motor arm extension 306 may also include other configurations or structures that facilitate movement, adjustment, or alteration of a position and/or angular orientation of the motor 108 and propeller 110 relative to a frame or other portions of an aerial vehicle. For example, other movable or pivotable connections may include hinged connections, rotatable connections, ball and socket connections, multiple arm linkage connections, sliding connections, telescoping connections, scissor lift connections, or other types of connections.

In addition, although FIGS. 3A and 3B show particular locations of shape memory actuators, other locations of shape memory actuators may also be included in the example propulsion mechanisms described herein. Further, although FIGS. 3A and 3B show shape memory actuators having particular configurations, e.g., substantially straight or U-shaped, the shape memory actuators described herein may also include other configurations, such as V-shapes, Z-shapes, W-shapes, other shapes, and/or other lengths.

Figure 4:
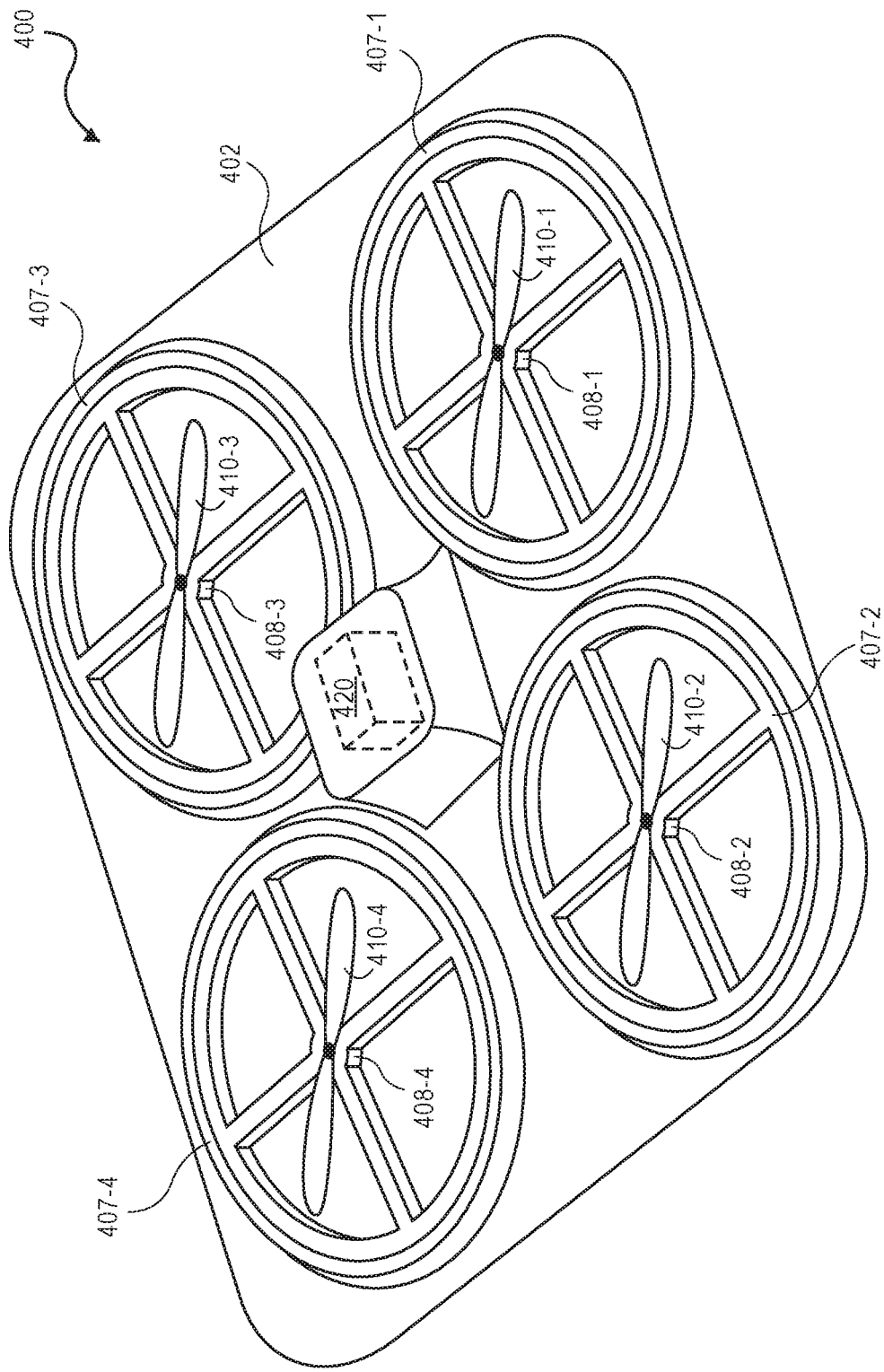
FIG. 4 is a schematic diagram of another example aerial vehicle including shape memory actuators, according to an implementation.

FIG. 4 is a schematic diagram of another example aerial vehicle 400 including shape memory actuators, according to an implementation.

The aerial vehicle 400 may include a frame 402, one or more motor openings 407, one or more motors 408, and one or more propellers 410. Although a particular configuration of an aerial vehicle 400 is shown in FIG. 4, the shape memory actuators as described herein may be used with any other configuration of an aerial vehicle, including the other configurations of aerial vehicles shown in FIGS. 1, 8, 9, 10A, 10B, 11A and 11B herein, having at least one component that may be moved, adjusted, or altered relative to the frame 402 or other portions of the aerial vehicle.

The frame 402 may form a main or central body or portion of the aerial vehicle 400. As shown in FIG. 4, the frame 402 may substantially encompass all components of the aerial vehicle within its perimeter. Various components may be housed or contained at least partially within the frame 402, including an aerial vehicle control system 420, one or more power supplies (not shown), a payload (not shown), as well as other electronic, avionic, operational, navigational and/or communication systems or components, sensor systems or components, controllers, processors, memory, and others.

The one or more motor openings 407 may be formed within the perimeter of the frame 402. The one or more motor openings 407 may be formed of any suitable material, such as metal, plastic, carbon fiber, other materials, or combinations thereof. The motor openings 407 may have any shape, and may be shaped to reduce aerodynamic drag, for example. Each motor opening 407 may include a motor 408 and corresponding propeller 410 positioned within the motor opening 407.

In the example aerial vehicle 400 shown in FIG. 4, four motor openings 407-1, 407-2, 407-3, 407-4 are formed within the frame 402, and each motor opening includes a motor 408-1, 408-2, 408-3, 408-4 and corresponding propeller 410-1, 410-2, 410-3, 410-4. Although an aerial vehicle 400 shown in FIG. 4 includes a particular number, combination, and arrangement of motor openings 407, motors 408, and propellers 410 within the frame 402, any other number, combination, or arrangement of motor openings, motors, or propellers is possible. For example, the motor openings 407, motors 408, and propellers 410 may be arranged within the frame 402 in various symmetrical or non-symmetrical arrangements.

In addition, any and all features described herein with respect to any other aerial vehicle configurations may also be included in the aerial vehicle 400 of FIG. 4, including any features related to the frame 402, motors 408, propellers 410, and/or the aerial vehicle control system 420.

Further, any of the various shape memory actuators described herein may be utilized to selectively move, adjust, or alter at least one component, such as control surfaces (not shown) on the frame 402, the motor openings 407, the motors 408, the propellers 410, and/or other propulsion mechanisms, relative to the frame 402 or other portions of the aerial vehicle.

For example, shape memory actuators may be used to move motors 408, propellers 410, or other propulsion mechanisms, such as altering angular orientations of the motors 408, propellers 410, or other propulsion mechanisms relative to the frame 402. In addition, shape memory actuators may also be used to actuate motors 408, propellers 410, or other propulsion mechanisms in other manners, such as raising, lowering, translating, or otherwise changing positions or angular orientations of the motors 408, propellers 410, or other propulsion mechanisms relative to the frame 402.

In addition, shape memory actuators may be utilized in the aerial vehicle 400 of FIG. 4 to move, adjust, or alter any and all features described herein with respect to any other aerial vehicle configurations, including any features related to the frames, wings, control surfaces, motor arms, motors, propellers, other propulsion mechanisms, payload doors, landing gears, internal components, and/or any other components of the aerial vehicle configurations.

Moreover, the aerial vehicle control system 420 of the aerial vehicle 400 of FIG. 4 may perform any and all functions and operations described herein with respect to aerial vehicle control systems of any other aerial vehicle configurations, including controlling the movement, adjustment, or alteration of at least one component using shape memory actuators based on data and information available to the aerial vehicle control system.

Figure 5:
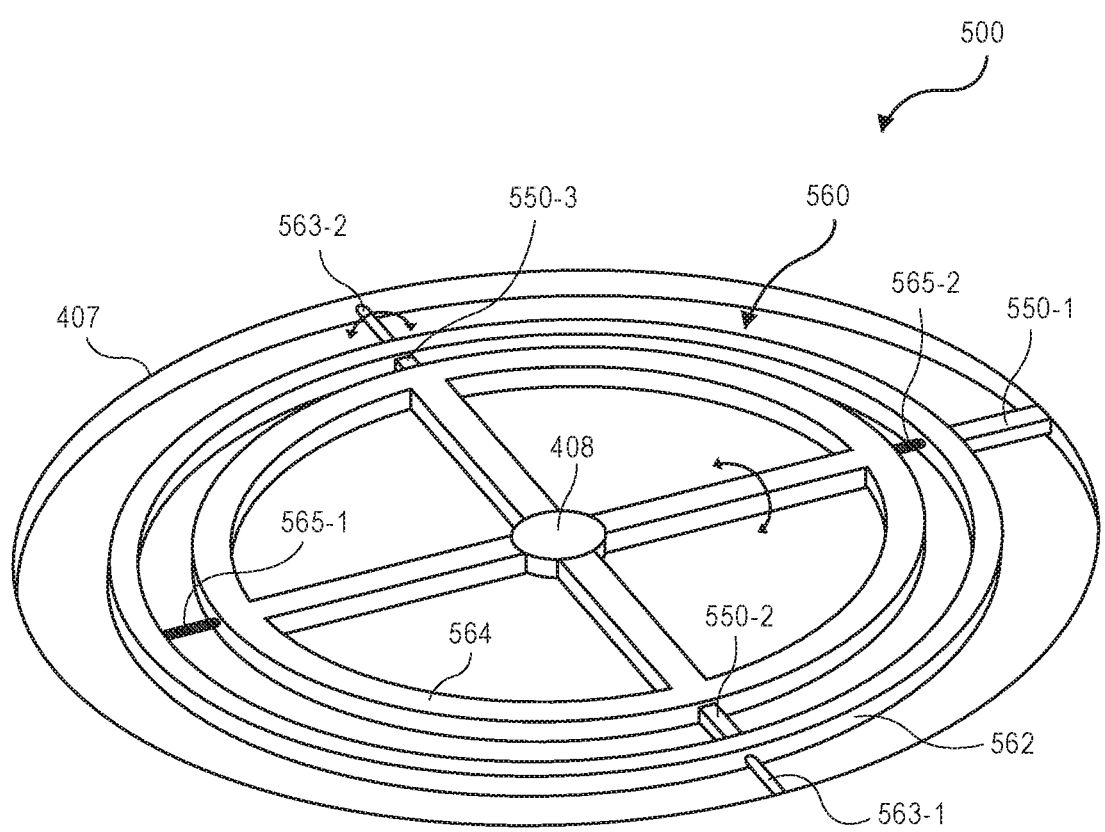
FIG. 5 is a schematic diagram of an example propulsion mechanism of an example aerial vehicle including shape memory actuators, according to an implementation.

FIG. 5 is a schematic diagram 500 of an example propulsion mechanism of an example aerial vehicle including shape memory actuators, according to an implementation.

As shown in FIG. 5, the example propulsion mechanism may include a gimbal mechanism 560 formed within a motor opening 407 and including a motor 408 and propeller (not shown), as described with respect to FIG. 4. The gimbal mechanism 560 may also include a first rotatable member 562 and a second rotatable member 564. The first rotatable member 562 may be coupled to the motor opening 407 via pins, rods, or shafts 563-1, 563-2 such that the first rotatable member 562 may rotate around a first axis that runs along the shafts 563-1, 563-2. Likewise, the second rotatable member 564 may be coupled to the first rotatable member 562 via pins, rods, or shafts 565-1, 565-2 such that the second rotatable member 564 may rotate around a second axis that runs along the shafts 565-1, 565-2. Further, the first axis and the second axis may intersect or may at least be non-collinear, such that each of the first rotatable member 562 and the second rotatable member 564 rotates around different axes. In example embodiments, the first axis and the second axis may intersect at approximately 90 degrees such that the rotations of the first rotatable member 562 and the second rotatable member 564 may be substantially orthogonal to each other.

Further, the motor 408 and propeller may be mounted to the second rotatable member 564, e.g., at approximately a center, such that the motor 408 and propeller may be moved or rotated by the first and second rotatable members 562, 564 between various positions or angular orientations. In addition, one or more shape memory actuators 550, e.g., one-way shape memory actuators or two-way shape memory actuators, may be coupled between portions of the motor opening 407 and the first rotatable member 562. Likewise, one or more shape memory actuators 550, e.g., one-way shape memory actuators or two-way shape memory actuators, may be coupled between portions of the first rotatable member 562 and the second rotatable member 564. Further, one or more bias elements may also be included in the gimbal mechanism 560 to maintain one or more portions of the gimbal mechanism in a particular configuration. In the example shown in FIG. 5, a first shape memory actuator 550-1 may be coupled between the motor opening 407 and the first rotatable member 562, and second and third shape memory actuators 550-2, 550-3 may be coupled between the first rotatable member 562 and the second rotatable member 564. However, other numbers, combinations, and arrangements of shape memory actuators may also be included in the example gimbal mechanism 560. Moreover, the shape memory actuators 550 may be coupled to various edges, surfaces, ridges, lips, overhangs, or other interfacing or opposing surfaces or portions of the motor opening 407, first rotatable member 562, and/or second rotatable member 564.

In example embodiments, one or more bias elements and the first shape memory actuator 550-1 may cooperate to pivot the first rotatable member 562 relative to the motor opening 407 between various configurations, e.g., upon application of heat above a transformation temperature associated with a material of the shape memory actuator 550-1 or upon application of a magnetic field to the material of the shape memory actuator 550-1. Similarly, one or more bias elements and the second and third shape memory actuators 550-2, 550-3 may cooperate to pivot the second rotatable member 564 relative to the first rotatable member 562 between various configurations, e.g., upon application of heat above transformation temperatures associated with materials of the shape memory actuators 550-2, 550-3 or upon application of magnetic fields to the materials of the shape memory actuators 550-2, 550-3. In this manner, portions of the gimbal mechanism 560 may be moved or pivoted relative to the motor opening 407 to move, adjust, or alter a position or angular orientation of the motor 408 and propeller relative to a frame or other portions of the aerial vehicle.

Based at least in part on design and/or selection of the shape memory actuators 550-1, 550-2, 550-3 having desired tensile strengths and desired configurations, e.g., with respective shapes and/or respective defined lengths, the motor 408 and propeller may be moved between various defined positions and/or angular orientations. For example, various combinations of one or more shape memory actuators 550 and/or one or more bias elements may cooperate to move the first rotatable member 562 between various positions and/or angular orientations. Simultaneously or individually, various combinations of one or more shape memory actuators 550 and/or one or more bias elements may cooperate to move the second rotatable member 564 between various positions and/or angular orientations.

In further example embodiments, the propulsion mechanism of FIG. 5 may include two-way shape memory actuators instead of or in combination with one-way shape memory actuators. In such examples, application of heat or first magnetic fields to a first set of the two-way shape memory actuators, e.g., shape memory actuators 550-1 and/or 550-2, and/or removal of heat or application of second magnetic fields to a second set of the two-way shape memory actuators, e.g., shape memory actuator 550-3, may move the motor and propeller to a first position or angular orientation, and application of heat or first magnetic fields to the second set of the two-way shape memory actuators, e.g., shape memory actuator 550-3, and/or removal of heat or application of second magnetic fields to the first set of the two-way shape memory actuators, e.g., shape memory actuators 550-1 and/or 550-2, may move the motor and propeller to a second position or angular orientation.

In still further example embodiments, one or more limits or stops may be included in the propulsion mechanism of FIG. 5, in order to further define one or more position limits to which the propulsion mechanisms may be moved. For example, one or more limits or stops may define a first position and/or first angular orientation of the motor and propeller, e.g., a vertical flight orientation, and one or more other limits or stops may define a second position and/or second angular orientation of the motor and propeller, e.g., a horizontal flight orientation. In other embodiments, the one or more limits or stops may define various positions or angular orientations other than positions or angular orientations associated with vertical flight or horizontal flight, as desired.

Although FIG. 5 shows a particular configuration a gimbal mechanism 560 having a motor 408 and propeller within a motor opening 407, the motor opening 407 and/or the gimbal mechanism 560 may also include other configurations or structures that facilitate movement, adjustment, or alteration of a position and/or angular orientation of the motor 408 and propeller relative to a frame or other portions of an aerial vehicle. For example, other movable or pivotable connections may include hinged connections, rotatable connections, ball and socket connections, multiple arm linkage connections, sliding connections, telescoping connections, scissor lift connections, or other types of connections. In addition, although the gimbal mechanism 560 shown in FIG. 5 includes a diameter that is substantially the same as a diameter of the propeller, the gimbal mechanism 560 may be formed with other diameters, e.g., a diameter that is smaller or larger than a diameter of the propeller.

In addition, although FIG. 5 shows particular locations of shape memory actuators, other locations of shape memory actuators may also be included in the example propulsion mechanism described herein. Further, although FIG. 5 shows shape memory actuators having particular configurations, e.g., substantially straight, the shape memory actuators described herein may also include other configurations, such as U-shapes, V-shapes, Z-shapes, W-shapes, other shapes, and/or other lengths.

Figure 6A:
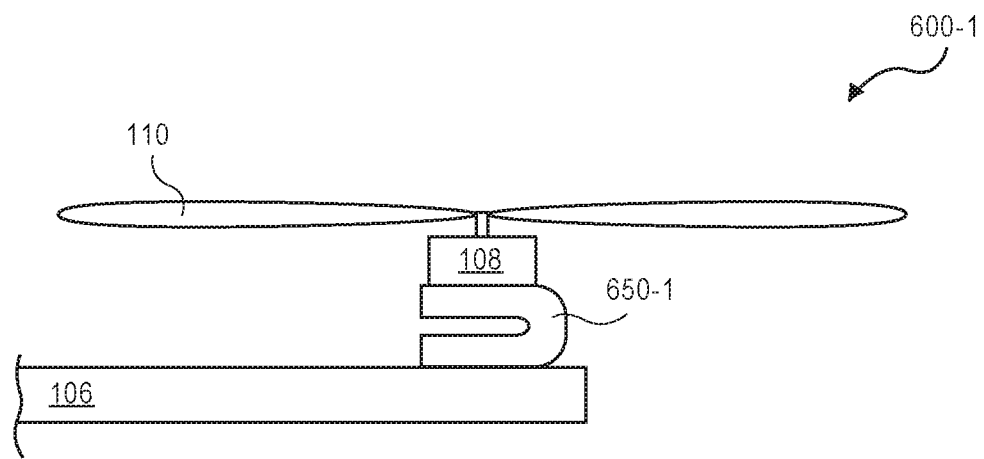
FIG. 6A is a schematic diagram of another example propulsion mechanism of an example aerial vehicle including shape memory actuators, according to an implementation.

FIG. 6A is a schematic diagram 600-1 of another example propulsion mechanism of an example aerial vehicle including shape memory actuators, according to an implementation.

As shown in FIG. 6A, the example propulsion mechanism may include a motor arm 106, a motor 108, and a propeller 110. In addition, a shape memory actuator 650-1, e.g., a one-way shape memory actuator or a two-way shape memory actuator, may be directly coupled between the motor arm 106 and the motor 108.

In example embodiments, the shape memory actuator 650-1 may move or pivot the motor 108 between various configurations. For example, as shown in FIG. 6A, the shape memory actuator 650-1 may be a one-way shape memory actuator having a U-shape configuration, e.g., having a first shape and/or first defined length, such that upon application of heat above a transformation temperature associated with a material of the shape memory actuator 650-1 or upon application of a magnetic field to the material of the shape memory actuator 650-1, the shape memory actuator 650-1 may return to the U-shape configuration from a deformed or modified configuration.

In other example embodiments, the shape memory actuator 650-1 may be a two-way shape memory actuator having a first U-shape configuration, e.g., having a first shape and/or first defined length, and a second different configuration, e.g., having a second shape and/or a second defined length, such that upon application of heat above a transformation temperature associated with a material of the shape memory actuator 650-1 or upon application of a second magnetic field to the material of the shape memory actuator 650-1, the shape memory actuator 650-1 may transition to the second configuration, and upon removal of heat below a transformation temperature associated with a material of the shape memory actuator 650-1 or upon application of a first magnetic field to the material of the shape memory actuator 650-1, the shape memory actuator 650-1 may transition back to the first configuration.

In this manner, the motor 108 may be moved or pivoted relative to the motor arm 106 to move, adjust, or alter a position or angular orientation of the motor 108 and propeller 110 relative to a frame or other portions of the aerial vehicle. In further example embodiments, one or more bias elements (not shown) may also be coupled between the motor arm 106 and the motor 108 and cooperate with the shape memory actuator 650-1 to move or pivot the motor 108 between various configurations.

Figure 6B:
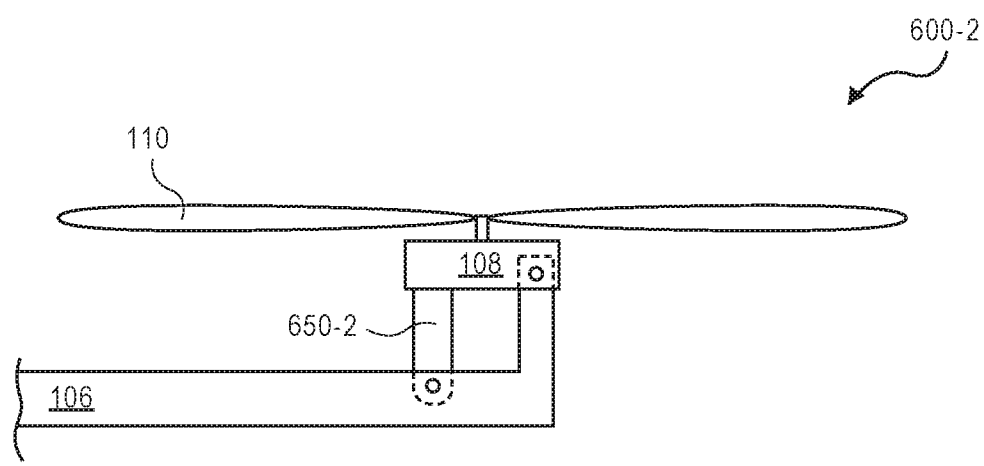
FIG. 6B is a schematic diagram of another example propulsion mechanism of an example aerial vehicle including shape memory actuators, according to an implementation.

FIG. 6B is a schematic diagram 600-2 of another example propulsion mechanism of an example aerial vehicle including shape memory actuators, according to an implementation.

As shown in FIG. 6B, the example propulsion mechanism may include a motor arm 106, a motor 108, and a propeller 110. In addition, a shape memory actuator 650-2, e.g., a one-way shape memory actuator or a two-way shape memory actuator, may be directly coupled between the motor arm 106 and the motor 108, and the motor 108 may also be movably or pivotably coupled to the motor arm 106.

In example embodiments, the shape memory actuator 650-2 may move or pivot the motor 108 between various configurations. For example, as shown in FIG. 6B, the shape memory actuator 650-2 may be a one-way shape memory actuator having a substantially straight configuration, e.g., having a first shape and/or first defined length, such that upon application of heat above a transformation temperature associated with a material of the shape memory actuator 650-2 or upon application of a magnetic field to the material of the shape memory actuator 650-2, the shape memory actuator 650-2 may return to the substantially straight configuration from a deformed or modified configuration.

In other example embodiments, the shape memory actuator 650-2 may be a two-way shape memory actuator having a first configuration, e.g., having a first shape and/or first defined length, and a second different configuration, e.g., having a second shape and/or a second defined length, such that upon application of heat above a transformation temperature associated with a material of the shape memory actuator 650-2 or upon application of a second magnetic field to the material of the shape memory actuator 650-2, the shape memory actuator 650-2 may transition to the second configuration, and upon removal of heat below a transformation temperature associated with a material of the shape memory actuator 650-2 or upon application of a first magnetic field to the material of the shape memory actuator 650-2, the shape memory actuator 650-2 may transition back to the first configuration.

In this manner, the motor 108 may be moved or pivoted relative to the motor arm 106 to move, adjust, or alter a position or angular orientation of the motor 108 and propeller 110 relative to a frame or other portions of the aerial vehicle. In further example embodiments, one or more bias elements (not shown) may also be coupled between the motor arm 106 and the motor 108 and cooperate with the shape memory actuator 650-2 to move or pivot the motor 108 between various configurations.

Figure 6C:
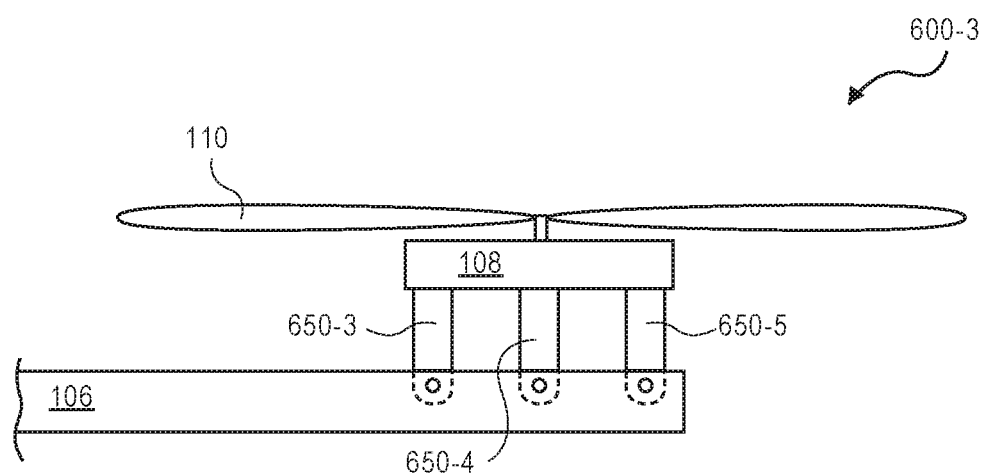
FIG. 6C is a schematic diagram of another example propulsion mechanism of an example aerial vehicle including shape memory actuators, according to an implementation.

FIG. 6C is a schematic diagram 600-3 of another example propulsion mechanism of an example aerial vehicle including shape memory actuators, according to an implementation.

As shown in FIG. 6C, the example propulsion mechanism may include a motor arm 106, a motor 108, and a propeller 110. In addition, a plurality of shape memory actuators 650-3, 650-4, 650-5, e.g., one-way shape memory actuators and/or two-way shape memory actuators, may be directly coupled between the motor arm 106 and the motor 108. The plurality of shape memory actuators 650 directly coupled to a single motor 108 may allow additional movement or pivoting between a greater number of possible positions and/or angular orientations.

In example embodiments, the shape memory actuators 650-3, 650-4, 650-5 may move or pivot the motor 108 between various configurations. For example, as shown in FIG. 6C, the shape memory actuators 650-3, 650-4, 650-5 may be one-way shape memory actuators having substantially straight configurations, e.g., having respective first shapes and/or first defined lengths, such that upon application of heat above transformation temperatures associated with materials of the shape memory actuators 650-3, 650-4, 650-5 or upon application of magnetic fields to the materials of the shape memory actuators 650-3, 650-4, 650-5, the shape memory actuators 650-3, 650-4, 650-5 may return to the substantially straight configurations from deformed or modified configurations.

In other example embodiments, the shape memory actuators 650-3, 650-4, 650-5 may be two-way shape memory actuators having respective first configurations, e.g., having respective first shapes and/or first defined lengths, and respective second different configurations, e.g., having respective second shapes and/or second defined lengths, such that upon application of heat above transformation temperatures associated with materials of the shape memory actuators 650-3, 650-4, 650-5 or upon application of second magnetic fields to the materials of the shape memory actuators 650-3, 650-4, 650-5, the shape memory actuators 650-3, 650-4, 650-5 may transition to the respective second configurations, and upon removal of heat below transformation temperatures associated with materials of the shape memory actuators 650-3, 650-4, 650-5 or upon application of first magnetic fields to the materials of the shape memory actuators 650-3, 650-4, 650-5, the shape memory actuators 650-3, 650-4, 650-5 may transition back to the respective first configurations.

In this manner, the motor 108 may be moved or pivoted relative to the motor arm 106 to move, adjust, or alter a position or angular orientation of the motor 108 and propeller 110 relative to a frame or other portions of the aerial vehicle. In further example embodiments, one or more bias elements (not shown) may also be coupled between the motor arm 106 and the motor 108 and cooperate with the shape memory actuators 650-3, 650-4, 650-5 to move or pivot the motor 108 between various configurations. In still further example embodiments, various combinations of one-way and two-way shape memory actuators may be used together as a plurality of shape memory actuators directly coupled to a motor 108.

In further example embodiments, one or more limits or stops may be included in the propulsion mechanisms of FIGS. 6A-6C in order to further define one or more position limits to which the propulsion mechanisms may be moved. For example, one or more limits or stops may define a first position and/or first angular orientation of the motor and propeller, e.g., a vertical flight orientation, and one or more other limits or stops may define a second position and/or second angular orientation of the motor and propeller, e.g., a horizontal flight orientation. In other embodiments, the one or more limits or stops may define various positions or angular orientations other than positions or angular orientations associated with vertical flight or horizontal flight, as desired.

Although FIGS. 6A-6C show particular configurations of propulsion mechanisms having shape memory actuators directly coupled to motors 108, the propulsion mechanisms may also include other configurations or structures combined with shape memory actuators that facilitate movement, adjustment, or alteration of a position and/or angular orientation of the motor 108 and propeller 110 relative to a frame or other portions of an aerial vehicle. For example, other movable or pivotable connections may include hinged connections, rotatable connections, ball and socket connections, multiple arm linkage connections, sliding connections, telescoping connections, scissor lift connections, or other types of connections.

In addition, although FIGS. 6A-6C show particular locations of shape memory actuators, other locations of shape memory actuators may also be included in the example propulsion mechanisms described herein. Moreover, although FIGS. 6A-6C show shape memory actuators having particular configurations, e.g., substantially straight or U-shaped, the shape memory actuators described herein may also include other configurations, such as V-shapes, Z-shapes, W-shapes, other shapes, and/or other lengths.

Figure 7A:
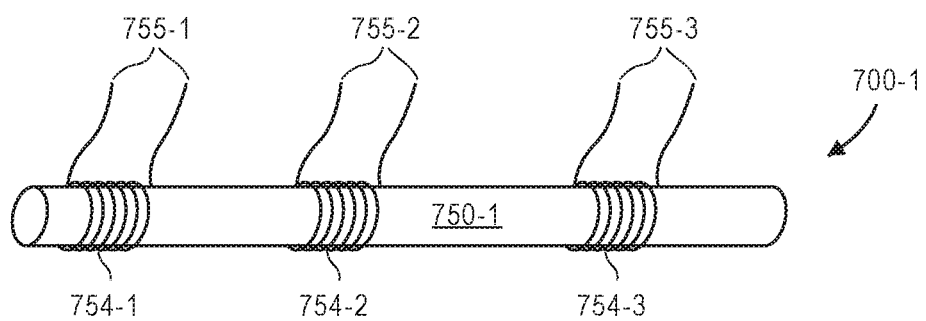
FIG. 7A is a schematic diagram of an example shape memory actuator, according to an implementation.

FIG. 7A is a schematic diagram 700-1 of an example shape memory actuator, according to an implementation.

As shown in FIG. 7A, the example shape memory actuator may include a one-way or two-way shape memory actuator 750-1. In addition, wires 754 or other electrically and/or thermally conductive materials may be wrapped or coiled around sections of the shape memory actuator 750-1. For example, three sets of wires 754-1, 754-2, 754-3 may be coiled around three different sections of the shape memory actuator 750-1, and each of the sets of wires 754-1, 754-2, 754-3 may include associated electrical or thermal leads 755-1, 755-2, 755-3. Although the shape memory actuator 750-1 is shown as a rope, column, rod or wire, the shape memory actuator 750-1 may also include other forms or shapes.

In example embodiments, current may be passed through one or more of the sets of wires 754-1, 754-2, 754-3. The current may result in heat being applied to one or more sections of the shape memory actuator 750-1, and/or the current may result in a magnetic field being applied to the one or more sections of the shape memory actuator 750-1. In other example embodiments, heat may be applied through one or more of the sets of thermally conductive wires 754-1, 754-2, 754-3, such that heat is then transferred to one or more sections of the shape memory actuator 750-1.

If the shape memory actuator 750-1 comprises a shape memory alloy or a shape memory polymer, the application of heat to one or more sections may result in changes to a configuration, e.g., a shape and/or a length, of the one or more sections. Similarly, if the shape memory actuator 750-1 comprises a magnetic shape memory alloy, the application of a magnetic field to one or more sections may result in changes to a configuration, e.g., a shape and/or a length, of the one or more sections.

Due to the selective application of heat and/or magnetic fields to one or more sections of the shape memory actuator 750-1, more precise control of the changes in configuration, e.g., changes in shape and/or length, may be achieved. For example, only one set of wires 754 or selected combinations of sets of wires 754 may apply heat and/or magnetic fields to selected sections of the shape memory actuator 750-1 in order to generate a desired configuration, e.g., a desired shape and/or desired length.

Figure 7B:
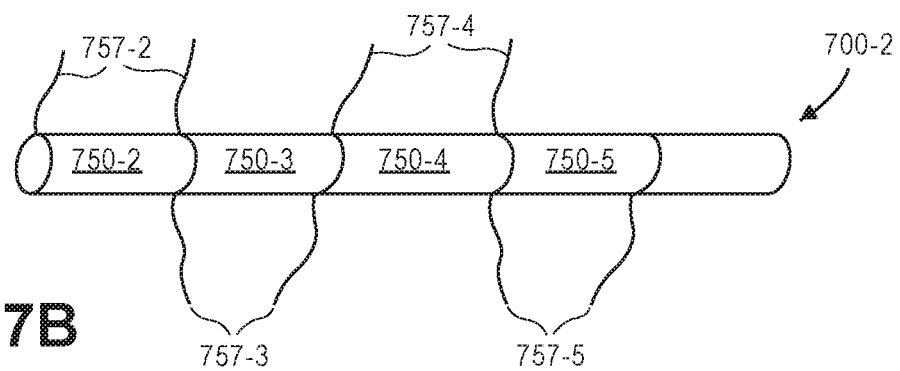
FIG. 7B is a schematic diagram of another example shape memory actuator, according to an implementation.

FIG. 7B is a schematic diagram 700-2 of another example shape memory actuator, according to an implementation.

As shown in FIG. 7B, the example shape memory actuator may include a plurality of one-way or two-way shape memory actuators 750-2, 750-3, 750-4, 750-5 connected in series with each other. In addition, each of the shape memory actuators 750-2, 750-3, 750-4, 750-5 connected in series may also include associated electrical or thermal leads 757-2, 757-3, 757-4, 757-5. Although the shape memory actuators 750-2, 750-3, 750-4, 750-5 connected in series are shown as a rope, column, rod or wire, the shape memory actuators 750-2, 750-3, 750-4, 750-5 may also include other forms or shapes.

In example embodiments, current may be passed through one or more of the shape memory actuators 750-2, 750-3, 750-4, 750-5 connected in series via one or more of the electrical leads 757-2, 757-3, 757-4, 757-5. The current may result in heat being applied to one or more of the shape memory actuators 750-2, 750-3, 750-4, 750-5 connected in series. In other example embodiments, heat may be applied through one or more of the thermal leads 757-2, 757-3, 757-4, 757-5 directly to one or more of the shape memory actuators 750-2, 750-3, 750-4, 750-5 connected in series.

If the shape memory actuators 750-2, 750-3, 750-4, 750-5 connected in series comprise shape memory alloys or shape memory polymers, the application of heat to one or more of the shape memory actuators may result in changes to a configuration, e.g., a shape and/or a length, of the one or more shape memory actuators.

Due to the selective application of heat to one or more of the shape memory actuators 750-2, 750-3, 750-4, 750-5 connected in series, more precise control of the changes in configuration, e.g., changes in shape and/or length, may be achieved. For example, only one set of leads 757 or selected combinations of sets of leads 757 may apply heat to selected shape memory actuators 750-2, 750-3, 750-4, 750-5 connected in series in order to generate a desired configuration, e.g., a desired shape and/or desired length.

Figure 7C:
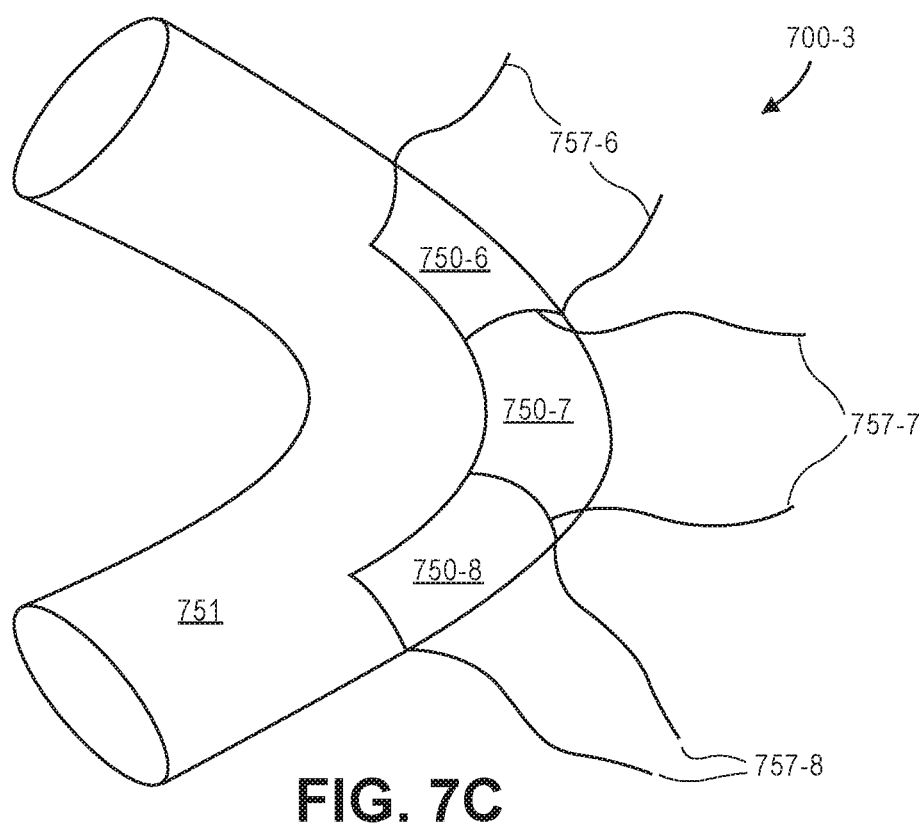
FIG. 7C is a schematic diagram of another example shape memory actuator, according to an implementation.

FIG. 7C is a schematic diagram 700-3 of another example shape memory actuator, according to an implementation.

As shown in FIG. 7C, the example shape memory actuator may include a plurality of one-way or two-way shape memory actuators 750-6, 750-7, 750-8 connected in series with each other. In addition, each of the shape memory actuators 750-6, 750-7, 750-8 connected in series may also include associated electrical or thermal leads 757-6, 757-7, 757-8. Further, the plurality of shape memory actuators 750-6, 750-7, 750-8 may form a part of, may be integrated at least partially within, or may be adhered or connected to a base material 751. The base material 751 may be formed of metal, plastic, carbon fiber, other materials, or combinations thereof, and the base material 751 may be deformable, bendable, and/or otherwise elastically modifiable responsive to actuation of the shape memory actuators 750-6, 750-7, 750-8. Although the shape memory actuators 750-6, 750-7, 750-8 connected in series are shown with a particular shape and configuration, the shape memory actuators 750-6, 750-7, 750-8 may also include other forms or shapes.

In example embodiments, current may be passed through one or more of the shape memory actuators 750-6, 750-7, 750-8 connected in series via one or more of the electrical leads 757-6, 757-7, 757-8. The current may result in heat being applied to one or more of the shape memory actuators 750-6, 750-7, 750-8 connected in series. In other example embodiments, heat may be applied through one or more of the thermal leads 757-6, 757-7, 757-8 directly to one or more of the shape memory actuators 750-6, 750-7, 750-8 connected in series.

If the shape memory actuators 750-6, 750-7, 750-8 connected in series comprise shape memory alloys or shape memory polymers, the application of heat to one or more of the shape memory actuators may result in changes to a configuration, e.g., a shape and/or a length, of the one or more shape memory actuators.

Due to the selective application of heat to one or more of the shape memory actuators 750-6, 750-7, 750-8 connected in series, more precise control of the changes in configuration, e.g., changes in shape and/or length, may be achieved. For example, only one set of leads 757 or selected combinations of sets of leads 757 may apply heat to selected shape memory actuators 750-6, 750-7, 750-8 connected in series in order to generate a desired configuration, e.g., a desired shape and/or desired length.

Moreover, due to the at least partial formation, integration, and/or adhesion of the plurality of shape memory actuators 750-6, 750-7, 750-8 within or to the base material 751, more precise control of the changes in configuration, e.g., changes in shape and/or length, of the base material 751 as a whole may be achieved by the selective actuation of one or more of the plurality of shape memory actuators 750-6, 750-7, 750-8. In addition, although the plurality of shape memory actuators 750-6, 750-7, 750-8 are shown in FIG. 7C at a particular location and arrangement within or adhered to the base material 751, the plurality of shape memory actuators 750-6, 750-7, 750-8 may be formed as part of, integrated within, or connected to the base material 751 in various other locations and arrangements.

Furthermore, any of the features of the different example embodiments described herein with respect to FIGS. 7A-7C may be combined to form other example embodiments in various combinations. For example, the plurality of shape memory actuators 750 shown in FIG. 7B or 7C may also include wires 754 wrapped around individual shape memory actuators 750 or sections of each of the shape memory actuators 750. In addition, magnetic fields may also be applied to individual shape memory actuators 750 or sections of each of the shape memory actuators 750 shown in FIG. 7B or 7C as described herein.

Figure 8:
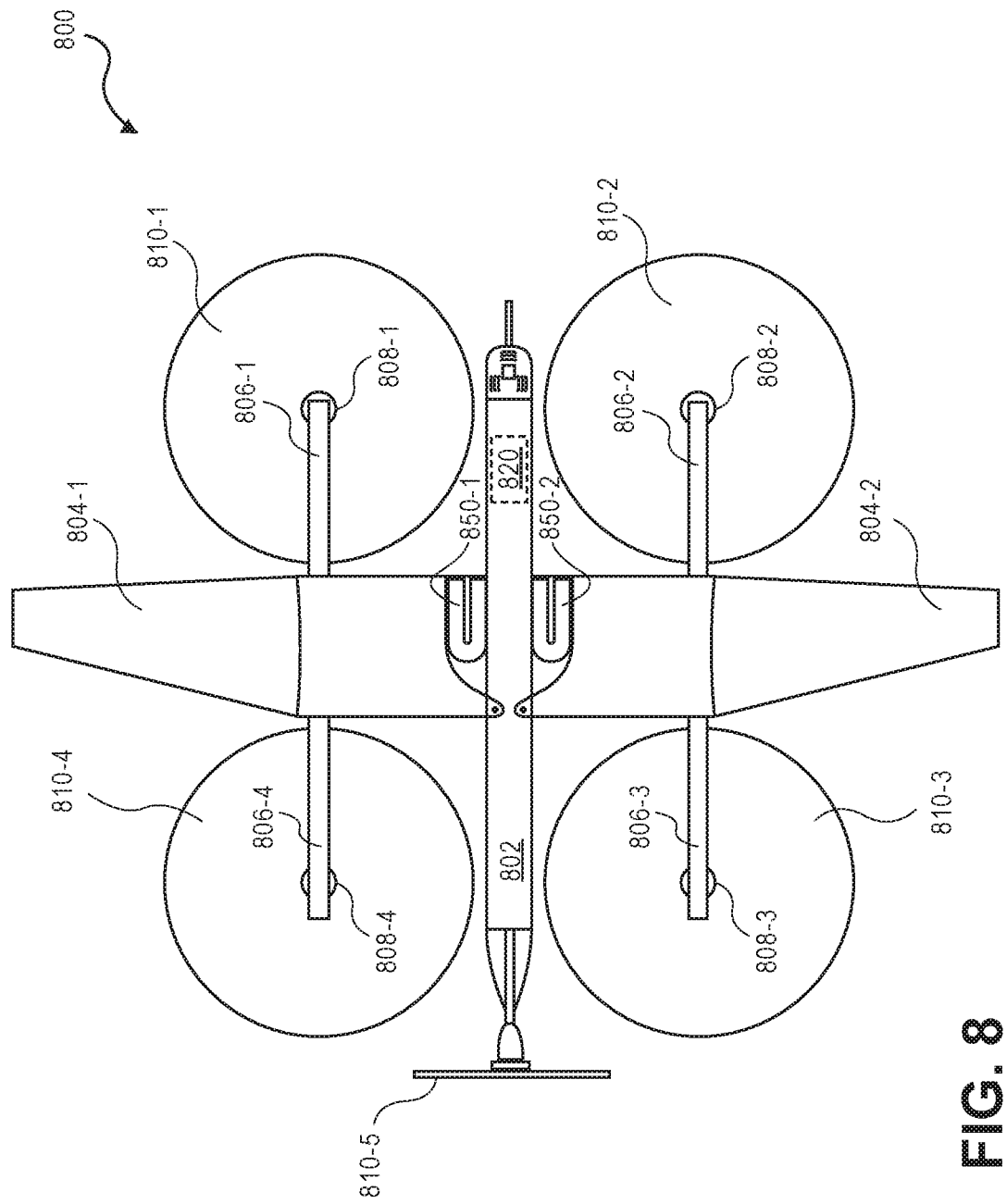
FIG. 8 is a schematic diagram of another example aerial vehicle having a wing and including shape memory actuators, according to an implementation.

FIG. 8 is a schematic diagram of another example aerial vehicle 800 having a wing and including shape memory actuators, according to an implementation.

The aerial vehicle 800 may include a frame or fuselage 802, one or more wings 804, one or more motor arms 806, one or more motors 808, and one or more propellers 810. Although a particular configuration of an aerial vehicle 800 is shown in FIG. 8, the shape memory actuators as described herein may be used with any other configuration of an aerial vehicle, including the other configurations of aerial vehicles shown in FIGS. 1, 4, 9, 10A, 10B, 11A and 11B herein, having at least one component that may be moved, adjusted, or altered relative to the frame or fuselage 802 or other portions of the aerial vehicle.

The frame or fuselage 802 may form a main or central body or portion of the aerial vehicle 800. Various components may be housed or contained at least partially within the frame 802, including an aerial vehicle control system 820, one or more power supplies (not shown), a payload (not shown), as well as other electronic, avionic, operational, navigational and/or communication systems or components, sensor systems or components, controllers, processors, memory, and others.

The one or more wings 804 may extend from either side of the frame 802, or may be a single continuous wing 804 that is coupled to the frame 802. In addition, the one or more wings 804 may include one or more ailerons, flaps, or other control surfaces (not shown) to control flight characteristics of the aerial vehicle 800.

The one or more motor arms 806 may be coupled to and extend from one of the frame 802 or the one or more wings 804. Each motor arm 806 may include a motor 808 and corresponding propeller 810 along a portion of its length, e.g., at an end distal from a connection to the frame 802 or the one or more wings 804.

In the example aerial vehicle 800 shown in FIG. 8, four motor arms 806-1, 806-2, 806-3, 806-4 are coupled to and extend from one of the frame 802 or the one or more wings 804, and each motor arm includes a motor 808-1, 808-2, 808-3, 808-4 and corresponding propeller 810-1, 810-2, 810-3, 810-4. In addition, a thrusting propeller 810-5 and corresponding motor are also included in the aerial vehicle 800. Although the aerial vehicle 800 shown in FIG. 8 includes a particular number, combination, and arrangement of motor arms 806, motors 808, and propellers 810, any other number, combination, or arrangement of motor arms, motors, or propellers is possible. For example, the motor arms 806, motors 808, and propellers 810 may be coupled to the frame 802 or the one or more wings 804 in various combinations of vertically downward facing and vertically upward facing motor arms, motors, and propellers, and/or in various symmetrical or non-symmetrical arrangements.

In addition, any and all features described herein with respect to any other aerial vehicle configurations may also be included in the aerial vehicle 800 of FIG. 8, including any features related to the frame 802, wings 804, motor arms 806, motors 808, propellers 810, and/or the aerial vehicle control system 820.

Further, any of the various shape memory actuators described herein may be utilized to selectively move, adjust, or alter at least one component, such as the one or more wings 804, control surfaces of the wings 804, the motor arms 806, the motors 808, the propellers 810, and/or other propulsion mechanisms, relative to the frame 802 or other portions of the aerial vehicle.

As shown in FIG. 8, the one or more wings 804 may be movably or pivotably connected to the frame 802, e.g., to extend the wings 804 outward and/or forward, or to retract the wings 804 inward and/or rearward, in order to increase, improve, or modify efficiency, stability, safety, thrust, acceleration, or other flight dynamics or characteristics, for example. In addition, one or more shape memory actuators 850 may be associated with each of the one or more wings 804. For example, a first shape memory actuator 850-1 may be associated with a first wing 804-1, and a second shape memory actuator 850-2 may be associated with a second wing 804-2. As shown in FIG. 8, the first and second shape memory actuators 850-1, 850-2 may include U-shaped configurations. However, shape memory actuators having other configurations may also be used in association with the wings 804 of the aerial vehicle 800. In addition, the shape memory actuators 850 may actuate the one or more wings 804 of the aerial vehicle 800 using any of the combinations or arrangements of shape memory actuators as described herein with respect to FIG. 2A-3B, or 5-7C.

For example, the first and second shape memory actuators 850-1, 850-2 may be one-way shape memory actuators or two-way shape memory actuators. In example embodiments in which the shape memory actuators 850-1, 850-2 are one-way shape memory actuators, a bias element may also be associated with each of the one or more wings 804. In this manner, the bias element may apply a force to the one or more wings 804 to move the wings 804 to a first position, and the one-way shape memory actuators 850 may apply a force in an opposite direction as that of the bias element, upon application of heat or magnetic fields to the material of the shape memory actuators 850, to move the wings 804 to a second position. In alternative example embodiments in which the shape memory actuators 850-1, 850-2 are two-way shape memory actuators, the shape memory actuators 850 may apply a force to the one or more wings 804 to move the wings 804 to a first position, upon application of heat or first magnetic fields, and the shape memory actuators 850 may apply a force to the one or more wings 804 to move the wings 804 to a second position, upon removal of heat or application of second magnetic fields. In still further example embodiments in which multiple shape memory actuators 850 are associated with each of the one or more wings 840, the multiple shape memory actuators 850 may apply a force to the one or more wings 804 to move the wings 804 to a first position, upon application of heat or first magnetic fields to a first set of shape memory actuators 850 and/or upon removal of heat or application of second magnetic fields to a second set of shape memory actuators 850, and the shape memory actuators 850 may apply a force to the one or more wings 804 to move the wings 804 to a second position, upon application of heat or first magnetic fields to the second set of shape memory actuators 850 and/or upon removal of heat or application of second magnetic fields to the first set of shape memory actuators 850.

Moreover, the shape memory actuators 850 may also be used to actuate the one or more wings 804 in other manners, such as raising, lowering, elongating, shortening, or otherwise changing positions or angular orientations of the one or more wings 804 relative to the frame 802.

In addition, shape memory actuators may be utilized in the aerial vehicle 800 of FIG. 8 to move, adjust, or alter any and all features described herein with respect to any other aerial vehicle configurations, including any features related to the frames, wings, control surfaces, motor arms, motors, propellers, other propulsion mechanisms, payload doors, landing gears, internal components, and/or any other components of the aerial vehicle configurations.

Moreover, the aerial vehicle control system 820 of the aerial vehicle 800 of FIG. 8 may perform any and all functions and operations described herein with respect to aerial vehicle control systems of any other aerial vehicle configurations, including controlling the movement, adjustment, or alteration of at least one component using shape memory actuators based on data and information available to the aerial vehicle control system.

Figure 9:
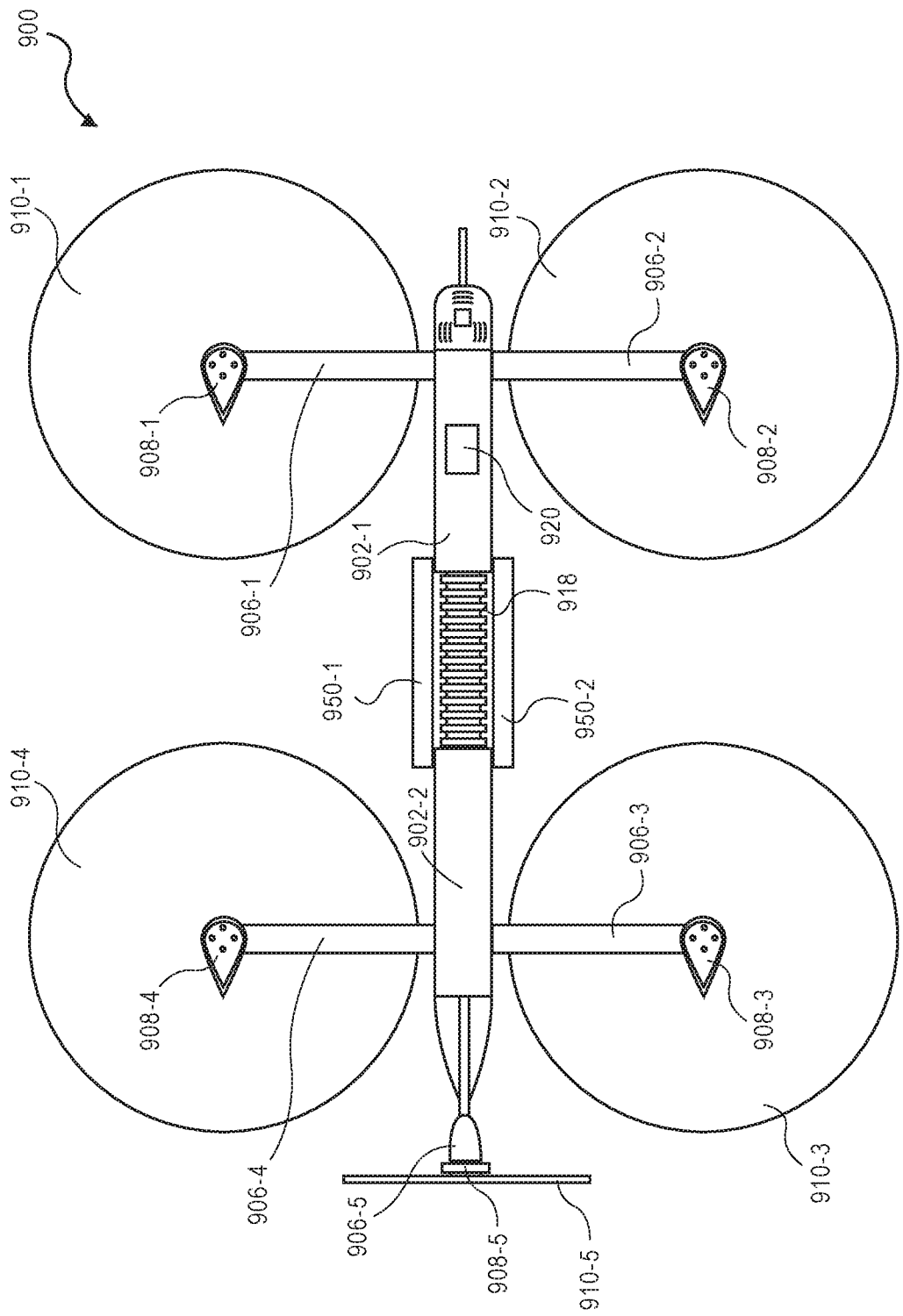
FIG. 9 is a schematic diagram of another example aerial vehicle having multiple frame sections and including shape memory actuators, according to an implementation.

FIG. 9 is a schematic diagram of another example aerial vehicle 900 having multiple frame sections and including shape memory actuators, according to an implementation.

The aerial vehicle 900 may include a frame or fuselage 902 including two or more frame sections 902-1, 902-2, one or more motor arms 906, one or more motors 908, and one or more propellers 910. Although a particular configuration of an aerial vehicle 900 is shown in FIG. 9, the shape memory actuators as described herein may be used with any other configuration of an aerial vehicle, including the other configurations of aerial vehicles shown in FIGS. 1, 4, 8, 10A, 10B, 11A and 11B herein, having at least one component that may be moved, adjusted, or altered relative to the frame or fuselage 902 or other portions of the aerial vehicle.

The frame or fuselage 902 may form a main or central body or portion of the aerial vehicle 900. Various components may be housed or contained at least partially within the frame 902, including an aerial vehicle control system 920, one or more power supplies (not shown), a payload (not shown), as well as other electronic, avionic, operational, navigational and/or communication systems or components, sensor systems or components, controllers, processors, memory, and others.

In addition, the frame 902 may be formed from two or more frame sections 902-1, 902-2 that are joined together via a compliant or resilient member 918. For example, the compliant member 918 may be formed of any suitable material, such as metal, plastic, carbon fiber, other materials, or combinations thereof. In some example embodiments, the compliant member 918 may comprise a spring or other resilient element, e.g., an elastically bendable member. In other example embodiments, the compliant member 918 may comprise a plurality of segments that are movably connected to each other, e.g., a member similar to a spine or backbone, a member having a plurality of ball and socket joints or pivoting joints, and/or a member having a plurality of telescoping segments. The compliant member 918 joining the two or more frame sections 902-1, 902-2 may enable a first frame section 902-1 to move relative to a second frame section 902-2, e.g., the first frame section 902-1 may bend, turn, and/or twist relative to the second frame section 902-2.

The one or more motor arms 906 may be coupled to and extend from the frame 902. Each motor arm 906 may include a motor 908 and corresponding propeller 910 along a portion of its length, e.g., at an end distal from a connection to the frame 902.

In the example aerial vehicle 900 shown in FIG. 9, four motor arms 906-1, 906-2, 906-3, 906-4 are coupled to and extend from the frame 902, and each motor arm includes a motor 908-1, 908-2, 908-3, 908-4 and corresponding propeller 910-1, 910-2, 910-3, 910-4. In addition, a thrusting propeller 910-5 and corresponding motor 908-5 and motor arm 906-5 are also included in the aerial vehicle 900. Although the aerial vehicle 900 shown in FIG. 9 includes a particular number, combination, and arrangement of motor arms 906, motors 908, and propellers 910, any other number, combination, or arrangement of motor arms, motors, or propellers is possible. For example, the motor arms 906, motors 908, and propellers 910 may be coupled to the frame 902 in various combinations of vertically downward facing and vertically upward facing motor arms, motors, and propellers, and/or in various symmetrical or non-symmetrical arrangements.

In addition, any and all features described herein with respect to any other aerial vehicle configurations may also be included in the aerial vehicle 900 of FIG. 9, including any features related to the frame 902, motor arms 906, motors 908, propellers 910, and/or the aerial vehicle control system 920.

Further, any of the various shape memory actuators described herein may be utilized to selectively move, adjust, or alter at least one component, such as the one or more frame sections 902-1, 902-2, the motor arms 906, the motors 908, the propellers 910, and/or other propulsion mechanisms, relative to the frame 902, one or more frame sections 902-1, 902-2, or other portions of the aerial vehicle.

As shown in FIG. 9, the one or more frame sections 902-1, 902-2 may be connected via a compliant member 918 that may enable a first frame section 902-1 to move relative to a second frame section 902-2, e.g., the first frame section 902-1 may bend, turn, and/or twist relative to the second frame section 902-2, in order to increase, improve, or modify efficiency, stability, safety, thrust, acceleration, or other flight dynamics or characteristics, for example. In addition, one or more shape memory actuators 950 may be associated with the one or more frame sections 902-1, 902-2. For example, a first shape memory actuator 950-1 may be associated with a first side of the compliant member 918 and coupled between the two frame sections 902-1, 902-2, and a second shape memory actuator 950-2 may be associated with a second side of the compliant member 918 and coupled between the two frame sections 902-1, 902-2. As shown in FIG. 9, the first and second shape memory actuators 950-1, 950-2 may include substantially straight configurations. However, shape memory actuators having other configurations may also be used in association with the frame sections 902-1, 902-2 of the aerial vehicle 900. In addition, the shape memory actuators 950 may actuate the one or more frame sections 902-1, 902-2 of the aerial vehicle 900 using any of the combinations or arrangements of shape memory actuators as described herein with respect to FIG. 2A-3B, or 5-7C.

For example, the first and second shape memory actuators 950-1, 950-2 may be one-way shape memory actuators or two-way shape memory actuators. In example embodiments in which the shape memory actuators 950-1, 950-2 are one-way shape memory actuators, one or more bias elements may also be associated with the one or more frame sections 902-1, 902-2, and/or the compliant member 918 may function as a bias element. In this manner, the one or more bias elements and/or the compliant member 918 may apply forces to the one or more frame sections 902-1, 902-2 to maintain the frame sections 902-1, 902-2 in a particular configuration, e.g., substantially aligned along a straight line, and the one-way shape memory actuators 950-1, 950-2 may apply forces in opposite directions from each other, upon application of heat or magnetic fields to the material of one or the other of the shape memory actuators 950-1, 950-2, to bend, twist, and/or turn the frame sections 902-1, 902-2 toward opposite bent or twisted positions relative to each other, e.g., a bent position to the right or a bent position to the left. In alternative example embodiments in which the shape memory actuators 950-1, 950-2 are two-way shape memory actuators, the shape memory actuators 950 may apply forces to the one or more frame sections 902-1, 902-2 to move the frame sections 902-1, 902-2 to a first bent or twisted position, upon appropriate application or removal of heat or application of magnetic fields to one or more of the shape memory actuators 950-1, 950-2, and the shape memory actuators 950 may apply forces to the one or more frame sections 902-1, 902-2 to move the frame sections 902-1, 902-2 to a second bent or twisted position, upon appropriate application or removal of heat or application of magnetic fields to one or more of the shape memory actuators 950-1, 950-2.

Moreover, the shape memory actuators 950 may also be used to actuate the one or more frame sections 902-1, 902-2 in other manners, such as bending or twisting upward, bending or twisting downward, elongating, shortening, or otherwise changing positions or angular orientations of the one or more frame sections 902-1, 902-2 relative to each other.

In addition, shape memory actuators may be utilized in the aerial vehicle 900 of FIG. 9 to move, adjust, or alter any and all features described herein with respect to any other aerial vehicle configurations, including any features related to the frames, wings, control surfaces, motor arms, motors, propellers, other propulsion mechanisms, payload doors, landing gears, internal components, and/or any other components of the aerial vehicle configurations.

Moreover, the aerial vehicle control system 920 of the aerial vehicle 900 of FIG. 9 may perform any and all functions and operations described herein with respect to aerial vehicle control systems of any other aerial vehicle configurations, including controlling the movement, adjustment, or alteration of at least one component using shape memory actuators based on data and information available to the aerial vehicle control system.

FIGS. 10A and 10B are schematic diagrams 1000-1, 1000-2 of another example aerial vehicle having multiple arms and including shape memory actuators, according to an implementation.

As shown in FIGS. 10A and 10B, the aerial vehicle may include a frame or fuselage 1002 including one or more motor arms 1006, one or more motors (not shown), and one or more propellers 1010. Although a particular configuration of an aerial vehicle is shown in FIGS. 10A and 10B, the shape memory actuators as described herein may be used with any other configuration of an aerial vehicle, including the other configurations of aerial vehicles shown in FIGS. 1, 4, 8, 9, 11A and 11B herein, having at least one component that may be moved, adjusted, or altered relative to the frame or fuselage 1002 or other portions of the aerial vehicle.

The frame or fuselage 1002 may form a main or central body or portion of the aerial vehicle. Various components may be housed or contained at least partially within the frame 1002, including an aerial vehicle control system (not shown), one or more power supplies (not shown), a payload (not shown), as well as other electronic, avionic, operational, navigational and/or communication systems or components, sensor systems or components, controllers, processors, memory, and others.

The one or more motor arms 1006 may be coupled to and extend from the frame 1002. Each motor arm 1006 may include a motor and corresponding propeller 1010 along a portion of its length, e.g., at an end distal from a connection to the frame 1002.

In addition, each motor arm 1006 may also include one or more joints 1005 along its length and/or a connection joint 1015 to the frame 1002. For example, as shown in FIGS. 10A and 10B, each motor arm 1006 may be coupled to the frame 1002 at a respective connection joint 1015 at respective corners of the frame 1002, and each motor arm 1006 may include a joint 1005 along its length. Each of the connection joints 1015 and the one or more joints 1005 may enable the motor arms 1006 or portions of the motor arms 1006 to bend, twist, and/or turn relative to the frame 1002 or relative to other portions of the motor arms 1006.

In the example aerial vehicle shown in FIGS. 10A and 10B, four motor arms 1006-1, 1006-2, 1006-3, 1006-4 are coupled to and extend from the frame 1002 at respective connection joints 1015-1, 1015-2, 1015-3, 1015-4, and each motor arm includes a respective joint 1005-1, 1005-2, 1005-3, 1005-4 and a motor and corresponding propeller 1010-1, 1010-2, 1010-3, 1010-4. Although the aerial vehicle shown in FIGS. 10A and 10B includes a particular number, combination, and arrangement of motor arms 1006, connection joints 1015, joints 1005, motors, and propellers 1010, any other number, combination, or arrangement of motor arms, connection joints, joints, motors, or propellers is possible. For example, the motor arms 1006, motors, and propellers 1010 may be coupled to the frame 1002 in various combinations or arrangements of vertically downward facing and vertically upward facing motor arms, motors, and propellers, and/or in various symmetrical or non-symmetrical arrangements.

In addition, any and all features described herein with respect to any other aerial vehicle configurations may also be included in the aerial vehicle of FIGS. 10A and 10B, including any features related to the frame 1002, motor arms 1006, motors, propellers 1010, and/or an aerial vehicle control system.

Further, any of the various shape memory actuators described herein may be utilized to selectively move, adjust, or alter at least one component, such as the motor arms 1006, the motors, the propellers 1010, and/or other propulsion mechanisms, relative to the frame 1002, one or more portions of the motor arms 1006, or other portions of the aerial vehicle.

As shown in FIGS. 10A and 10B, the one or more motor arms 1006 may be coupled to the frame 1002 via connection joints 1015. In addition, the one or more motor arms 1006 may include bendable or twistable joints 1005 along their lengths, in order to increase, improve, or modify efficiency, stability, safety, thrust, acceleration, or other flight dynamics or characteristics, for example. One or more shape memory actuators 1050 may be coupled between portions of the motor arms 1006 around the joints 1005, e.g., coupled between portions of the motor arms 1006 on opposite sides of the joints 1005. FIGS. 10A and 10B schematically show four shape memory actuators 1050-1, 1050-2, 1050-3, 1050-4 associated with respective joints 1005-1, 1005-2, 1005-3, 1005-4 of the motor arms 1006-1, 1006-2, 1006-3, 1006-4. In this manner, the portions of the motor arms 1006 may be bent or twisted relative to each other. As shown in FIG. 10A, each of the motor arms 1006 may have been bent or twisted at respective joints 1005, e.g., by actuation of shape memory actuators 1050, such that the motors and propellers 1010 are moved closer to a center of mass of the aerial vehicle. In contrast, as shown in FIG. 10B, each of the motor arms 1006 may have been bent or twisted at respective joints 1005 in an opposite direction from that shown in FIG. 10A, e.g., by actuation of shape memory actuators 1050, such that the motors and propellers 1010 are moved farther from a center of mass of the aerial vehicle.

In addition, although not shown in FIGS. 10A and 10B, one or more shape memory actuators may also be coupled between the motor arms 1006 and the frame 1002 around the connection joints 1015, e.g., coupled between the motor arms 1006 and the frame 1002 on opposite sides of the connection joints 1015. In this manner, the motor arms 1006 may be bent or twisted relative to the frame 1002, e.g., to extend the motor arms 1006 farther from a center of mass of the aerial vehicle or to retract the motor arms 1006 closer to a center of mass of the aerial vehicle.

As shown in FIGS. 10A and 10B, the shape memory actuators 1050 may move between substantially straight configurations and substantially bent configurations, e.g., approximately 90 degrees bent. However, shape memory actuators having other configurations may also be used in association with the motor arms 1006 of the aerial vehicle. In addition, the shape memory actuators 1050 may actuate the motor arms 1006 of the aerial vehicle using any of the combinations or arrangements of shape memory actuators as described herein with respect to FIG. 2A-3B, or 5-7C.

For example, the shape memory actuators 1050 may be one-way shape memory actuators or two-way shape memory actuators. In example embodiments in which the shape memory actuators 1050 are one-way shape memory actuators, one or more bias elements may also be associated with the joints 1005 of the motor arms 1006. In this manner, the one or more bias elements may apply forces to the portions of the motor arms 1006 to maintain the portions of the motor arms 1006 in a particular configuration, e.g., in a substantially straight configuration or a substantially bent configuration, and the one-way shape memory actuators 1050 may apply forces that oppose the forces of the bias elements, upon application of heat or magnetic fields to the material of the shape memory actuators 1050, to bend, twist, and/or turn the portions of the motor arms 1006 to a different configuration. In alternative example embodiments in which the shape memory actuators 1050 are two-way shape memory actuators, the shape memory actuators 1050 may apply forces to the portions of the motor arms 1006 to move the portions of the motor arms 1006 to a first configuration, upon appropriate application or removal of heat or application of magnetic fields to the shape memory actuators 1050, and the shape memory actuators 1050 may apply forces to the portions of the motor arms 1006 to move the portions of the motor arms 1006 to a second configuration, upon appropriate application or removal of heat or application of magnetic fields to the shape memory actuators 1050. In still further example embodiments in which multiple shape memory actuators 1050 are associated with each of the motor arms 1006, the multiple shape memory actuators 1050 may apply a force to the portions of the motor arms 1006 to move the portions of the motor arms 1006 to a first position, upon application of heat or first magnetic fields to a first set of shape memory actuators 1050 and/or upon removal of heat or application of second magnetic fields to a second set of shape memory actuators 1050, and the shape memory actuators 1050 may apply a force to the portions of the motor arms 1006 to move the portions of the motor arms 1006 to a second position, upon application of heat or first magnetic fields to the second set of shape memory actuators 1050 and/or upon removal of heat or application of second magnetic fields to the first set of shape memory actuators 1050.

Moreover, the shape memory actuators 1050 may also be used to actuate the motor arms 1006 or portions of the motor arms 1006 in other manners, such as bending or twisting upward, bending or twisting downward, elongating, shortening, or otherwise changing relative positions or angular orientations of the motor arms 1006 or portions of the motor arms 1006 relative to each other.

In addition, shape memory actuators may be utilized in the aerial vehicle of FIGS. 10A and 10B to move, adjust, or alter any and all features described herein with respect to any other aerial vehicle configurations, including any features related to the frames, wings, control surfaces, motor arms, motors, propellers, other propulsion mechanisms, payload doors, landing gears, internal components, and/or any other components of the aerial vehicle configurations.

Although not shown in FIGS. 10A and 10B, the aerial vehicle may also include an aerial vehicle control system that performs any and all functions and operations described herein with respect to aerial vehicle control systems of other aerial vehicle configurations, including controlling the movement, adjustment, or alteration of at least one component using shape memory actuators based on data and information available to the aerial vehicle control system.

Figure 11A:
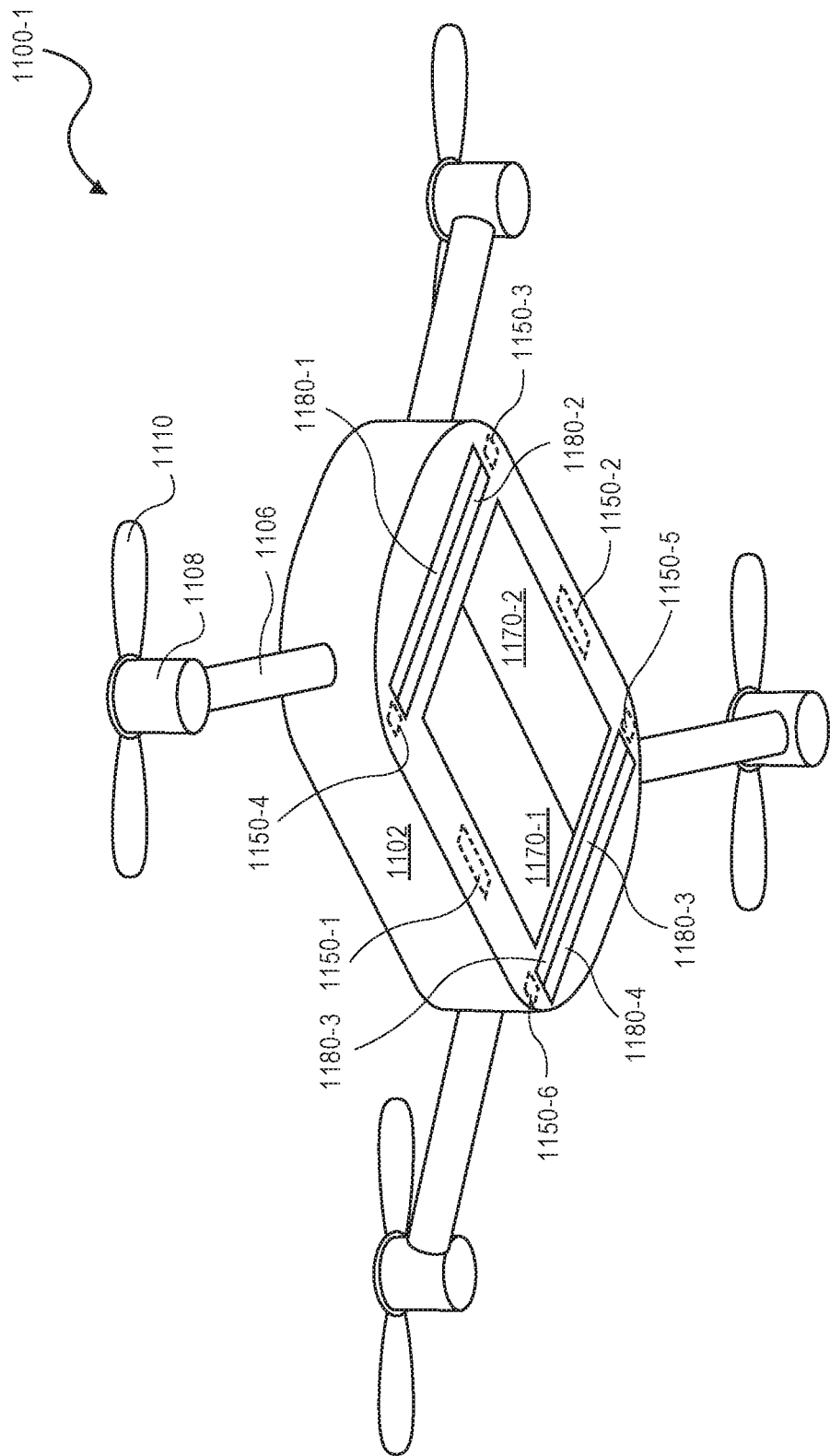
FIGS. 11A and 11B are schematic diagrams of another example aerial vehicle having payload doors and landing gears and including shape memory actuators, according to an implementation.
Figure 11B:
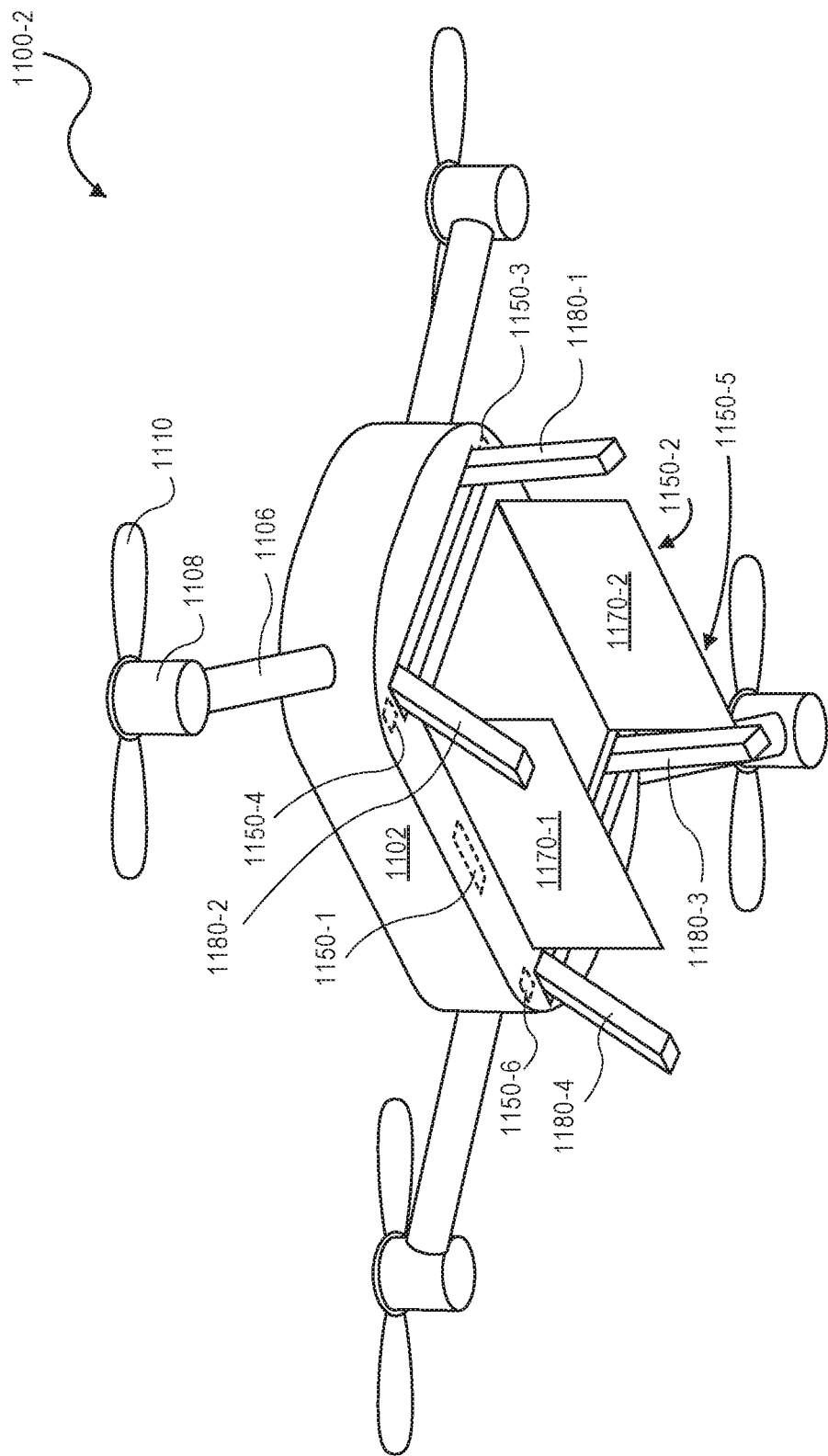

FIGS. 11A and 11B are schematic diagrams 1100-1, 1100-2 of another example aerial vehicle having payload doors and landing gears and including shape memory actuators, according to an implementation.

The aerial vehicle may include a frame or fuselage 1102 including one or more motor arms 1106, one or more motors 1108, and one or more propellers 1110. Although a particular configuration of an aerial vehicle is shown in FIGS. 11A and 11B, the shape memory actuators as described herein may be used with any other configuration of an aerial vehicle, including the other configurations of aerial vehicles shown in FIGS. 1, 4, 8, 9, 10A and 10B herein, having at least one component that may be moved, adjusted, or altered relative to the frame or fuselage 1102 or other portions of the aerial vehicle.

The frame or fuselage 1102 may form a main or central body or portion of the aerial vehicle. Various components may be housed or contained at least partially within the frame 1102, including an aerial vehicle control system (not shown), one or more power supplies (not shown), a payload (not shown), as well as other electronic, avionic, operational, navigational and/or communication systems or components, sensor systems or components, controllers, processors, memory, and others.

The one or more motor arms 1106 may be coupled to and extend from the frame 1102. Each motor arm 1106 may include a motor 1108 and corresponding propeller 1110 along a portion of its length, e.g., at an end distal from a connection to the frame 1102.

In the example aerial vehicle shown in FIGS. 11A and 11B, four motor arms 1106 are coupled to and extend from the frame 1102 and include a corresponding motor 1108 and corresponding propeller 1110. Although the aerial vehicle shown in FIGS. 11A and 11B includes a particular number, combination, and arrangement of motor arms 1106, motors 1108, and propellers 1110, any other number, combination, or arrangement of motor arms, motors, or propellers is possible. For example, the motor arms 1106, motors 1108, and propellers 1110 may be coupled to the frame 1102 in various combinations or arrangements of vertically downward facing and vertically upward facing motor arms, motors, and propellers, and/or in various symmetrical or non-symmetrical arrangements.

In addition, as shown in FIGS. 11A and 11B, the frame 1102 may also include payload doors 1170 and landing gears 1180. For example, the frame 1102 may include two payload doors 1170-1, 1170-2 that can open and close to receive, retain, and/or release a payload transported by the aerial vehicle. Further, the frame 1102 may also include four landing gears 1180-1, 1180-2, 1180-3, 1180-4 that can retract during flight and extend during landing. Each of the payload doors 1170 and each of the landing gears 1180 may be movably or pivotably connected to the frame 1102, e.g., via hinged connections, rotatable connections, ball and socket connections, multiple arm linkage connections, sliding connections, telescoping connections, scissor lift connections, or other types of connections. Moreover, any other number, combination, or arrangement of payload doors 1170 and/or landing gears 1180 may also be included in various aerial vehicle configurations.

In addition, any and all features described herein with respect to any other aerial vehicle configurations may also be included in the aerial vehicle of FIGS. 11A and 11B, including any features related to the frame 1102, motor arms 1106, motors 1108, propellers 1110, and/or an aerial vehicle control system.

Further, any of the various shape memory actuators described herein may be utilized to selectively move, adjust, or alter at least one component, such as the payload doors 1170, the landing gears 1180, the motor arms 1106, the motors 1108, the propellers 1110, and/or other propulsion mechanisms, relative to the frame 1102 or other portions of the aerial vehicle.

With respect to FIGS. 11A and 11B, one or more shape memory actuators 1150 may be associated with each of the payload doors 1170 and/or landing gears 1180. For example, shape memory actuators 1150-1, 1150-2 may be coupled around the movable or pivotable connections of the payload doors 1170 to the frame 1102, and/or shape memory actuators 1150-3, 1150-4, 1150-5, 1150-6 may be coupled around the movable or pivotable connections of the landing gears 1180 to the frame 1102. In this manner, the payload doors 1170 and/or the landing gears 1180 may be opened, closed, extended, retracted, rotated, or otherwise moved relative to the frame 1102. As shown in FIG. 11A, each of the payload doors 1170 and landing gears 1180 may have been moved to closed or retracted configurations, e.g., by actuation of shape memory actuators 1150. In contrast, as shown in FIG. 11B, each of the payload doors 1170 and landing gears 1180 may have been moved to opened or extended configurations, e.g., by actuation of shape memory actuators 1150.

With respect to FIGS. 11A and 11B, shape memory actuators 1150 having various configurations may be used in association with the payload doors 1170 and landing gears 1180 of the aerial vehicle. In addition, the shape memory actuators 1150 may actuate the payload doors 1170 and landing gears 1180 of the aerial vehicle using any of the combinations or arrangements of shape memory actuators as described herein with respect to FIG. 2A-3B, or 5-7C.

For example, the shape memory actuators 1150 may be one-way shape memory actuators or two-way shape memory actuators. In example embodiments in which the shape memory actuators are one-way shape memory actuators, one or more bias elements may also be associated with the payload doors 1170 or landing gears 1180. In this manner, the one or more bias elements may apply forces to the payload doors 1170 or landing gears 1180 to maintain the payload doors 1170 or landing gears 1180 in a particular configuration, e.g., a closed configuration or a retracted configuration, and the one-way shape memory actuators may apply forces that oppose the forces of the bias elements, upon application of heat or magnetic fields to the material of the shape memory actuators, to move the payload doors 1170 or landing gears 1180 to a different configuration, e.g., an open configuration or an extended configuration. In alternative example embodiments in which the shape memory actuators are two-way shape memory actuators, the shape memory actuators may apply forces to the payload doors 1170 or landing gears 1180 to move the payload doors 1170 or landing gears 1180 to a first configuration, upon appropriate application or removal of heat or application of magnetic fields to the shape memory actuators, and the shape memory actuators may apply forces to the payload doors 1170 or landing gears 1180 to move the payload doors 1170 or landing gears 1180 to a second configuration, upon appropriate application or removal of heat or application of magnetic fields to the shape memory actuators. In still further example embodiments in which multiple shape memory actuators are associated with each of the payload doors 1170 or each of the landing gears 1180, the multiple shape memory actuators may apply a force to the payload doors 1170 or landing gears 1180 to move the payload doors 1170 or landing gears 1180 to a first position, upon application of heat or first magnetic fields to a first set of shape memory actuators and/or upon removal of heat or application of second magnetic fields to a second set of shape memory actuators, and the shape memory actuators may apply a force to the payload doors 1170 or landing gears 1180 to move the payload doors 1170 or landing gears 1180 to a second position, upon application of heat or first magnetic fields to the second set of shape memory actuators and/or upon removal of heat or application of second magnetic fields to the first set of shape memory actuators.

Moreover, shape memory actuators 1150 may also be used to actuate payload doors 1170 or landing gears 1180 in other manners, such as rotating, translating, or otherwise changing positions or angular orientations of the payload doors 1170, or elongating, shortening, or otherwise changing positions or angular orientations of the landing gears 1180 relative to the frame 1102.

In addition, shape memory actuators may be utilized in the aerial vehicle of FIGS. 11A and 11B to move, adjust, or alter any and all features described herein with respect to any other aerial vehicle configurations, including any features related to the frames, wings, control surfaces, motor arms, motors, propellers, other propulsion mechanisms, payload doors, landing gears, internal components, and/or any other components of the aerial vehicle configurations.

Although not shown in FIGS. 11A and 11B, the aerial vehicle may also include an aerial vehicle control system that performs any and all functions and operations described herein with respect to aerial vehicle control systems of other aerial vehicle configurations, including controlling the movement, adjustment, or alteration of at least one component using shape memory actuators based on data and information available to the aerial vehicle control system.

Figure 12:
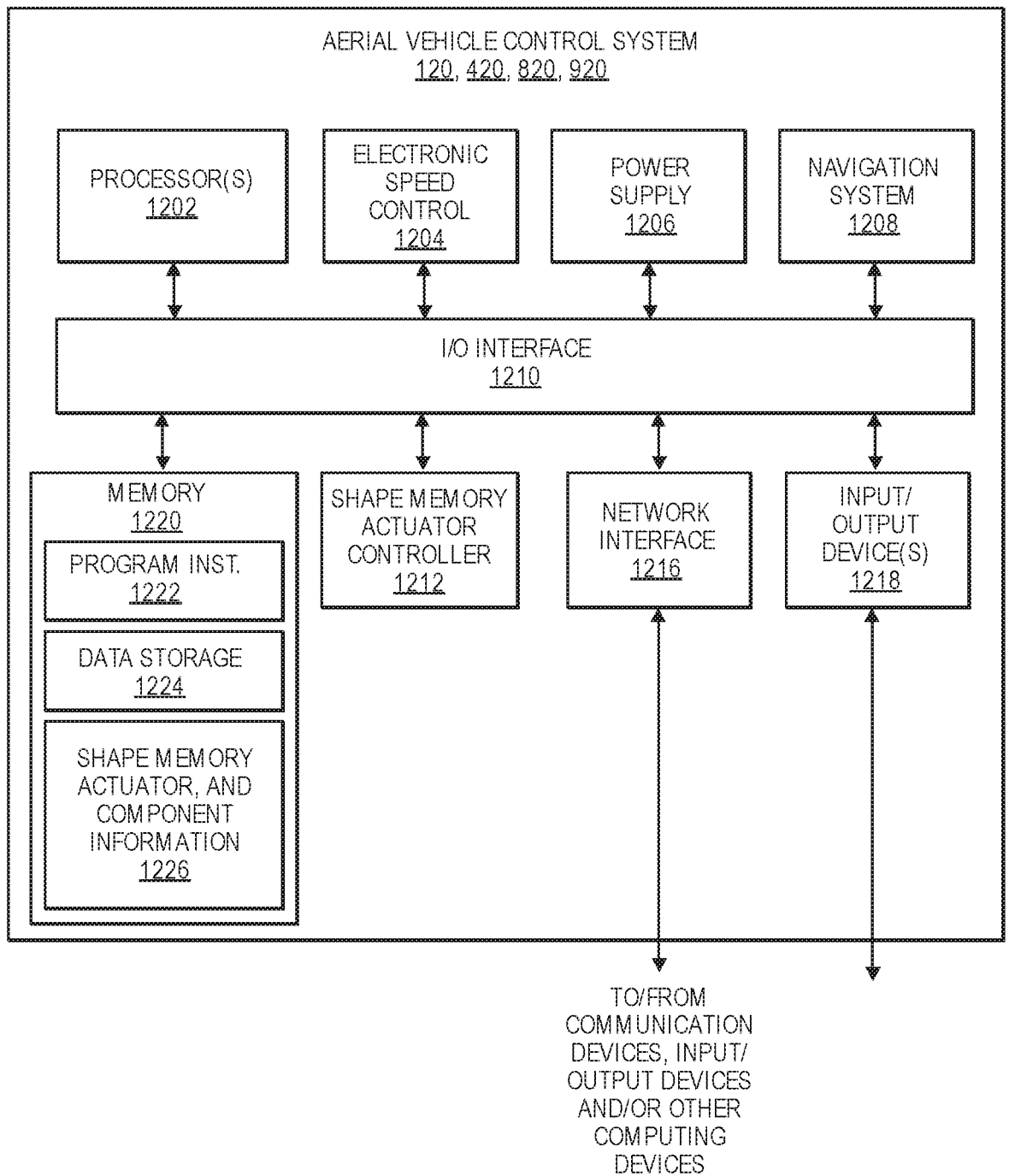
FIG. 12 is a block diagram illustrating various components of an aerial vehicle control system, according to an implementation.

FIG. 12 is a block diagram illustrating various components of an aerial vehicle control system 120, 420, 820, 920, according to an implementation. In various examples, the block diagram may be illustrative of one or more aspects of the aerial vehicle control system that may be used to implement the various systems and processes discussed above. In the illustrated implementation, the aerial vehicle control system includes one or more processors 1202, coupled to a non-transitory computer readable storage medium or memory 1220 via an input/output (I/O) interface 1210. The aerial vehicle control system may also include a propulsion controller or electronic speed control 1204, a power controller/supply module 1206 and/or a navigation system 1208. The aerial vehicle control system further includes a shape memory actuator controller 1212, a network interface 1216, and one or more input/output devices 1218.

In various implementations, the aerial vehicle control system may be a uniprocessor system including one processor 1202, or a multiprocessor system including several processors 1202 (e.g., two, four, eight, or another suitable number). The processor(s) 1202 may be any suitable processor capable of executing instructions. For example, in various implementations, the processor(s) 1202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1202 may commonly, but not necessarily, implement the same ISA.

The non-transitory computer readable storage medium or memory 1220 may be configured to store executable instructions, data, aerial vehicle operational data, flight data, navigation data, location data, environment data, shape memory actuator data and characteristics, component data and characteristics, and/or other data items accessible by the processor(s) 1202. In various implementations, the non-transitory computer readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1220 as program instructions 1222, data storage 1224 and shape memory actuator and component information 1226, respectively. In other implementations, program instructions, data and/or shape memory actuator and component information may be received, sent or stored upon different types of computer-accessible media, such as non-transitory media, or on similar media separate from the non-transitory computer readable storage medium 1220 or the aerial vehicle control system.

Generally speaking, a non-transitory, computer readable storage medium may include storage media or memory media such as magnetic or optical media, e.g., disk or CD/DVD-ROM, coupled to the aerial vehicle control system via the I/O interface 1210. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1216.

In one implementation, the I/O interface 1210 may be configured to coordinate I/O traffic between the processor(s) 1202, the non-transitory computer readable storage medium 1220, and any peripheral devices, the network interface 1216 or other peripheral interfaces, such as input/output devices 1218. In some implementations, the I/O interface 1210 may perform any necessary protocol, timing or other data transformations to convert data signals from one component (e.g., non-transitory computer readable storage medium 1220) into a format suitable for use by another component (e.g., processor(s) 1202). In some implementations, the I/O interface 1210 may include support for devices attached through various types of peripheral buses, such as a variant of the Peripheral Component Interconnect (PCI) bus standard or the Universal Serial Bus (USB) standard, for example. In some implementations, the function of the I/O interface 1210 may be split into two or more separate components, such as a north bridge and a south bridge, for example. Also, in some implementations, some or all of the functionality of the I/O interface 1210, such as an interface to the non-transitory computer readable storage medium 1220, may be incorporated directly into the processor(s) 1202.

The propulsion controller or electronic speed control 1204 communicates with the navigation system 1208 and adjusts the operational characteristics of each propulsion mechanism to guide the aerial vehicle along a determined flight path and/or to perform other navigational maneuvers. The navigation system 1208 may include a GPS or other similar system than can be used to navigate the aerial vehicle to and/or from a location.

The aerial vehicle control system may also include a shape memory actuator controller 1212. The shape memory actuator controller 1212 communicates with the shape memory actuators described herein, and with the processor(s) 1202, the power controller/supply module 1206, and/or the memory 1220 to actuate one or more shape memory actuators. For example, the shape memory actuator controller 1212 may control the application of heat or magnetic fields to the shape memory actuators to move, adjust, or alter motor arms, motors, propellers, other propulsion mechanisms, wings, control surfaces, frame sections, motor arm sections, or other components of the aerial vehicle to modify various aspects of the aerial vehicle, such as efficiency, stability, safety, thrust, acceleration, maneuverability, agility, or other flight dynamics or characteristics. In addition, the shape memory actuator controller 1212 may also control the application of heat or magnetic fields to the shape memory actuators to move, adjust, or alter payload doors, landing gears, or other components to modify various aspects of the aerial vehicle during takeoff, landing, payload intake, payload release, or other flight or navigation operations.

The network interface 1216 may be configured to allow data to be exchanged between the aerial vehicle control system, other components of the aerial vehicle, other devices connected to a network, such as other computer systems, aerial vehicle control systems of other aerial vehicles, and/or an overall aerial vehicle management system. For example, the network interface 1216 may enable wireless communication between numerous aerial vehicles and/or computer systems. In various implementations, the network interface 1216 may support communication via wireless general data networks, such as a Wi-Fi network. For example, the network interface 1216 may support communication via telecommunications networks such as cellular communication networks, satellite networks, and the like.

Input/output devices 1218 may, in some implementations, include one or more displays, image capture devices, thermal sensors, infrared sensors, time of flight sensors, accelerometers, pressure sensors, weather sensors, other sensors described herein, etc. Multiple input/output devices 1218 may be present and controlled by the aerial vehicle control system. Data from one or more of these sensors may be utilized by the shape memory actuator controller 1212 to control the movement, adjustment, or alteration of one or more components by shape memory actuators.

As shown in FIG. 12, the memory 1220 may include program instructions 1222 which may be configured to implement the example processes and/or sub-processes described above. The data storage 1224 and shape memory actuator and component information 1226 may include various data stores for maintaining data items that may be provided for navigation, communication, and other operations of the aerial vehicle, and for control of the movement, adjustment, or alteration of one or more components by shape memory actuators.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the aerial vehicle control system is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The aerial vehicle control system may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the aerial vehicle control system may be transmitted to the aerial vehicle control system via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other aerial vehicle control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An unmanned aerial vehicle, comprising:
an aerial vehicle frame;
a gimbal mechanism coupled to the aerial vehicle frame;
a motor coupled to the gimbal mechanism and movable relative to the aerial vehicle frame;
a propeller configured to be rotated by the motor; and
a shape memory actuator configured to move the motor relative to the aerial vehicle frame;
wherein the gimbal mechanism includes a first portion rotatable relative to the aerial vehicle frame around a first axis, and a second portion rotatable relative to the aerial vehicle frame around a second axis; and
wherein the first axis and the second axis are non-collinear.

2. The unmanned aerial vehicle of claim 1, further comprising:
a bias element configured to move the motor relative to the aerial vehicle frame;
wherein the shape memory actuator is configured to move the motor in a first direction, and the bias element is configured to move the motor in a second direction that is opposite to the first direction.

3. The unmanned aerial vehicle of claim 1, wherein the shape memory actuator is at least one of a one-way shape memory actuator or a two-way shape memory actuator.

4. The unmanned aerial vehicle of claim 1, wherein the unmanned aerial vehicle comprises a plurality of shape memory actuators configured to move the motor relative to the aerial vehicle frame;
wherein at least two of the plurality of shape memory actuators are configured to move the motor in at least one of orthogonal directions to each other or opposite directions to each other.

5. An unmanned aerial vehicle, comprising:
an aerial vehicle frame;
a component movably coupled to the aerial vehicle frame; and
a shape memory actuator configured to move the component relative to the aerial vehicle frame;
wherein the component comprises a payload door, and the shape memory actuator is configured to at least one of open or close the payload door; or
wherein the component comprises a landing gear, and the shape memory actuator is configured to at least one of extend or retract the landing gear.

6. The unmanned aerial vehicle of claim 5, wherein the shape memory actuator is directly coupled to a portion of the component.

7. The unmanned aerial vehicle of claim 5, wherein the unmanned aerial vehicle comprises a plurality of shape memory actuators configured to move the component relative to the aerial vehicle frame;
wherein at least two of the plurality of shape memory actuators are configured to move the component in different directions from each other.

8. The unmanned aerial vehicle of claim 5, wherein the shape memory actuator is at least one of a one-way shape memory actuator or a two-way shape memory actuator.

9. The unmanned aerial vehicle of claim 5, further comprising:
a bias element configured to oppose a movement of the component caused by the shape memory actuator.

10. The unmanned aerial vehicle of claim 5, wherein the component further comprises a propulsion mechanism; and
wherein the shape memory actuator is configured to alter an orientation of the propulsion mechanism relative to the aerial vehicle frame.

11. The unmanned aerial vehicle of claim 5, wherein the component further comprises a wing; and
wherein the shape memory actuator is configured to alter an orientation of the wing relative to the aerial vehicle frame.

12. The unmanned aerial vehicle of claim 5, wherein the component further comprises a control surface of a wing; and
wherein the shape memory actuator is configured to at least one of extend or retract the control surface of the wing.

13. The unmanned aerial vehicle of claim 5, wherein the component further comprises a first portion of the aerial vehicle frame; and
wherein the shape memory actuator is configured to alter an orientation of the first portion of the aerial vehicle frame relative to a second portion of the aerial vehicle frame.

14. The unmanned aerial vehicle of claim 5, wherein the component further comprises an arm coupled to the aerial vehicle frame; and
wherein the shape memory actuator is configured to alter an orientation of at least a portion of the arm relative to the aerial vehicle frame.

15. An unmanned aerial vehicle, comprising:
an aerial vehicle frame;
a gimbal mechanism coupled to the aerial vehicle frame;
a propulsion mechanism movably coupled to the aerial vehicle frame; and
at least one shape memory actuator configured to move the propulsion mechanism relative to the aerial vehicle frame;
wherein the propulsion mechanism is coupled to the gimbal mechanism and movable relative to the aerial vehicle frame;
wherein the gimbal mechanism includes a first portion rotatable relative to the aerial vehicle frame around a first axis, and a second portion rotatable relative to the aerial vehicle frame around a second axis; and
wherein the first axis and the second axis are non-collinear.

16. The unmanned aerial vehicle of claim 15, wherein the at least one shape memory actuator comprises a first shape memory actuator and a second shape memory actuator;
wherein the first shape memory actuator is coupled to the first portion of the gimbal mechanism, and is configured to rotate the first portion relative to the aerial vehicle frame around the first axis; and
wherein the second shape memory actuator is coupled to the second portion of the gimbal mechanism, and is configured to rotate the second portion relative to the aerial vehicle frame around the second axis.

* * * * *